(12) United States Patent
Fernandez et al.

(10) Patent No.: US 8,930,879 B2
(45) Date of Patent: Jan. 6, 2015

(54) APPLICATION BUILDING

(75) Inventors: Roland L. Fernandez, Woodinville, WA (US); George G. Robertson, Northeast Harbor, ME (US); Danyel A. Fisher, Seattle, WA (US); Daniel C. Robbins, Seattle, WA (US); Lev B. Nachmanson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1217 days.

(21) Appl. No.: 12/477,154

(22) Filed: Jun. 3, 2009

(65) Prior Publication Data

US 2010/0313181 A1 Dec. 9, 2010

(51) Int. Cl.
*G06F 9/44* (2006.01)
(52) U.S. Cl.
CPC .................................. *G06F 8/20* (2013.01)
USPC ............ 717/100; 717/107; 717/109; 717/120
(58) Field of Classification Search
USPC ....................................................... 717/100
See application file for complete search history.

(56) References Cited

U.S. PATENT DOCUMENTS

| | | | |
|---|---|---|---|
| 6,957,186 B1 | 10/2005 | Guheen et al. | |
| 7,089,560 B1 | 8/2006 | Uhler et al. | |
| 7,219,327 B1 | 5/2007 | Jacobs et al. | |
| 7,770,151 B2 | 8/2010 | Sanjar et al. | |
| 7,882,489 B2 | 2/2011 | Chandrasekharan et al. | |
| 7,921,408 B2 | 4/2011 | Shenfield et al. | |
| 7,926,029 B1 | 4/2011 | Stoyen et al. | |
| 2003/0005412 A1* | 1/2003 | Eanes ........................... | 717/120 |
| 2004/0117759 A1 | 6/2004 | Rippert et al. | |
| 2005/0262480 A1* | 11/2005 | Pik et al. ....................... | 717/120 |
| 2013/0212557 A1* | 8/2013 | Edmunds et al. ............. | 717/109 |

OTHER PUBLICATIONS

"IT Mill Toolkit 5—Technical description", Retrieved at<<http://www.itmill.com/itmill-toolkit/itmill-toolkit-5-whitepaper.pdf>>, pp. 4.
Ilog, Inc, "Building Graphical Displays for the Desktop and Web ", Retrieved at<<http://www.codeproject.com/KB/showcase/BuildingDisplays.aspx>>, Jul. 28, 2008, pp. 10.
Guldman Andrew, "Building Rich Internet Applications with Macromedia Flash MX and ColdFusion MX", Retrieved at<<http://www.adobe.com/resources/business/sample_apps/customer/customer_app.pdf>>, May 2002, pp. 40.
Kayl Kammie, "NetBeans 3.6 IDE Released", Retrieved at<<http://java.sun.com/developer/technicalArticles/JavaLP/NetBeans36/>>, Apr. 2004, pp. 6.
"Creating Web Services Using Novell exteNd and NetWare 6.5", Retrieved at<<http://www.polaris.lv/polaris/resources/nsbs/4621359.pdf>>, pp. 21.

* cited by examiner

*Primary Examiner* — Don Wong
*Assistant Examiner* — Deric Ortiz
(74) *Attorney, Agent, or Firm* — Sandy Swain; Judy Yee; Micky Minhas

(57) ABSTRACT

The described implementations relate to unified application building. In one implementation unified application building tools can include a unifying component model configured to communicate with a set of components that are supported by different frameworks. The unified application building tools can also include a unification engine configured to bind events between individual components in a unified manner that is independent of an individual framework upon which individual components are supported.

20 Claims, 18 Drawing Sheets

APPLICATION BUILDING

BACKGROUND

The role of the computer continues to expand from desktop to notebook to netbook to personal digital assistant (PDA) to cell phones and smart appliances. With the expanding role of the computer comes increasing demand for applications, such as device specific applications and web-based applications. Providing a pleasing User Experience (UX) for these applications continues to be a challenging task. Two major factors in this difficulty are the way UX designers work within the software development process and the difficulty of building modern applications whose quality level (lack of bugs) is high enough to ship. For instance, it can be difficult to focus on creating a pleasing UX when most of the resources go into fixing bugs.

Building applications today is a complex, expensive, and risky process, involving several phases, such as user/technology/market research, user experience (UX) design, architectural design, specification, programming, localization, testing, bug fixing, etc. A potentially problematic path (and perhaps the most complex phase) is the programming/testing/bug fixing path. The UX design is typically done relatively early in the process and removed from the working code. When the UX design is complete, it is transferred to the developers so they can "implement it" in the code. This means that although the UX design is created by the designer, it is then "owned" by the developer. There are several potential problems with this paradigm.

The first potential problem is that the UX design is subject to changes made by the developer. For instance, the developer may make changes in order to make the programming easier, to adjust the design to the programmer's opinion of what works best, and/or to define what happens in cases not anticipated by the UX designer. Second, as the design becomes real and tested by users, it usually requires adjustment. This adjustment is either done directly by the developer (since he now "owns" the design), or by the UX designer in a design environment that is isolated from the working code and then the adjustment is then transferred (and owned) by the developer.

Another potential problem is that as the individual features in the UX come together to make a whole application, it is potentially difficult to make UX adjustments across the whole application (based on problems discovered by real-code testing by users). The present concepts relate to unifying application building tools that address the above mentioned (and/or other) shortcomings of the existing paradigm.

SUMMARY

The described implementations relate to unified application building. In one implementation unified application building tools can include a unifying component model configured to communicate with a set of components that are supported by different frameworks. The unified application building tools can also include a unification engine configured to bind events between individual components in a unified manner that is independent of an individual framework upon which individual components are supported.

The term unified application building tools may refer to device(s), system(s), computer-readable instructions (e.g., one or more computer-readable media having executable instructions), component(s), module(s), and/or methods, among others, as permitted by the context above and throughout the document. In various instances, unified application building tools may be implemented as hardware, software, firmware, or combination thereof. The above listed examples are intended to provide a quick reference to aid the reader and are not intended to define the scope of the concepts described herein or the subject matter claimed.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent application relates to building applications using unifying application building tools. In some implementations, the unifying application building tools can generate a selectively-automatic integrated development environment (IDE) for application building. The selectively-automatic IDE can include a set of programs that can be run from a single user-interface to build an application. For example, the selectively-automatic IDE can offer a unified text editor, a unified compiler and a unified debugger, which can all be activated and function from a common menu, such as a toolbar.

Viewed from another perspective, some of the unifying application building tools can create a standardized or unifying component model for a user. The unifying application building tools can offer the user a set of user-specific components from which to build an application. The user can select some of the components to build the application. The user can also combine components to create new components to build the application.

The unifying component model can offer a unified way for the user to interact with components that is independent of a framework supporting individual components. Thus, the user can simply learn how to use the unifying component model rather than learning how to interact with various different component frameworks. Further, in some implementations, the standardized component model can enable components to work together regardless of their differing frameworks. The standardized component model can also allow user-selected components to work together with reduced (or potentially no) programming. In some implementations the unifying application building tools can utilize a new "flow" language to unify components and interactions between components.

First Example of Unifying Application Building

Figure 1:
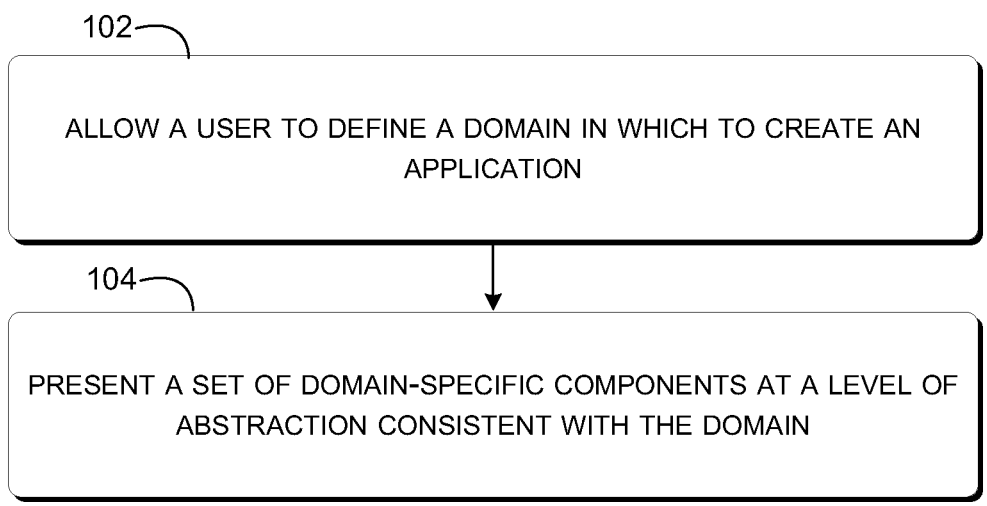
FIG. 1 shows an example of a method for implementing unified application building concepts in accordance with some implementations of the present concepts.

FIG. 1 offers an introductory example of some of the present concepts in the form of a unifying application building tool 100. In this case, unifying application building tool 100 can allow a user to define a domain in which to build an application at block 102. For instance, the user can define the domain by selecting the domain from a list of available domains. Briefly, allowing the user to define the building domain can allow the unifying application building tool to customize the remainder of the building process to the user and/or the type of application being built. This customization can create a more efficient and satisfying user experience. One manifestation of block 102 is described below in relation to FIGS. 2-4.

Block 104 can present a set of domain-specific components at a level of abstraction consistent with the domain. For instance, the user may want to work at a high level of abstraction or at a low level of abstraction. A high level of abstraction can be offered where many of the details regarding components and component interaction are handled automatically for the user. A low level abstraction environment can be offered to the user with increased granularity. Increased granularity exposes more details about the components, and their interactions to the user. Briefly, a higher level of abstraction can offer the user a shorter learning curve and a potentially shorter build time. In contrast, increased granularity can offer the user a higher degree of programmatic control but can be more time consuming. In some cases, a higher level of abstraction may be represented via a visual design(er) while a lower level of abstraction may be represented as corresponding programming text. One manifestation of block 104 is described below in relation to FIG. 5. Another example is described below relative to FIGS. 20-21.

To summarize, the present implementation can allow the user to define a domain in which to build an application. The user can also define domain specific parameters, such as a level of abstraction that the user wants to work at; and/or whether the user wants to work graphically or textually, etc. The unifying application building tool can facilitate the user in building the application based upon the user's selection(s).

First Example of a Unifying Application Building User-Interface

FIGS. 2-5 show a series of user-interface screenshots that can be generated during a unifying application building process in some implementations. In FIGS. 2-5, a suffix (i.e., (1), (2) . . . etc.) is utilized to distinguish the individual user-interfaces.

Figure 2:
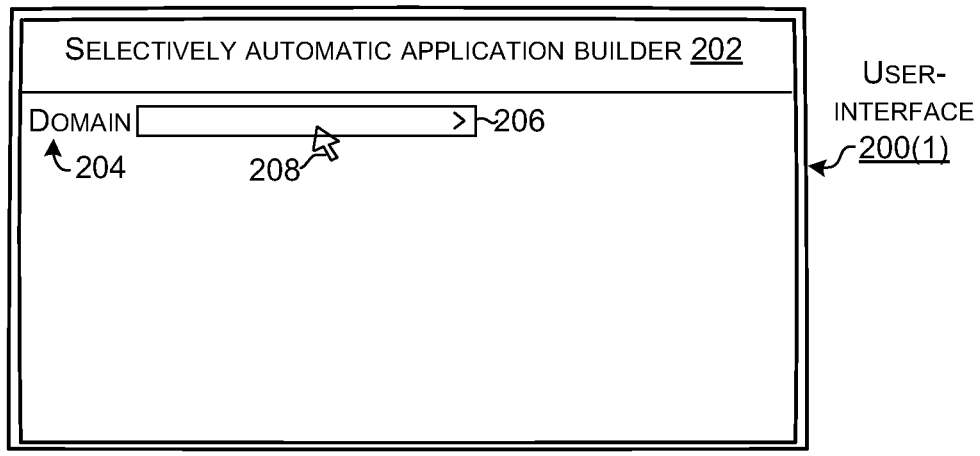
FIGS. 2-5 show user-interface screenshots that can be generated to accomplish unified application building in accordance with some implementations of the present concepts.

FIG. 2 shows a user-interface 200(1) that can be generated when a user launches a unifying application building tool in order to build a new program. This particular aspect of the unifying application building tool can be thought of as a selectively automatic application builder 202. The selectively automatic application builder can allow the user to define a domain 204 in which to design an application. The user can manually enter a domain into domain entry region 206. Alternatively or additionally, a listing of available domains can be provided for the user. In this particular implementation, the user can position his/her cursor 208 over domain entry region 204 to view the available domains as evidenced in FIG. 3.

The selectively automatic application builder can be thought of as being automatic in that it has the capability to perform many of the tedious programming functions, such as linking together components automatically for the user, and/or providing unifying infrastructure, etc. However, the capabilities of the selectively automatic application builder can be applied at a level selected or defined by the user. For instance, the user can select to work at a very high level and the selectively automatic application builder can automatically handle all of the underlying tasks. Conversely, if the user selects to manually handle the programming details then the application builder only automatically handles any remaining tasks, such as providing the underlying unifying infrastructure.

Figure 3:
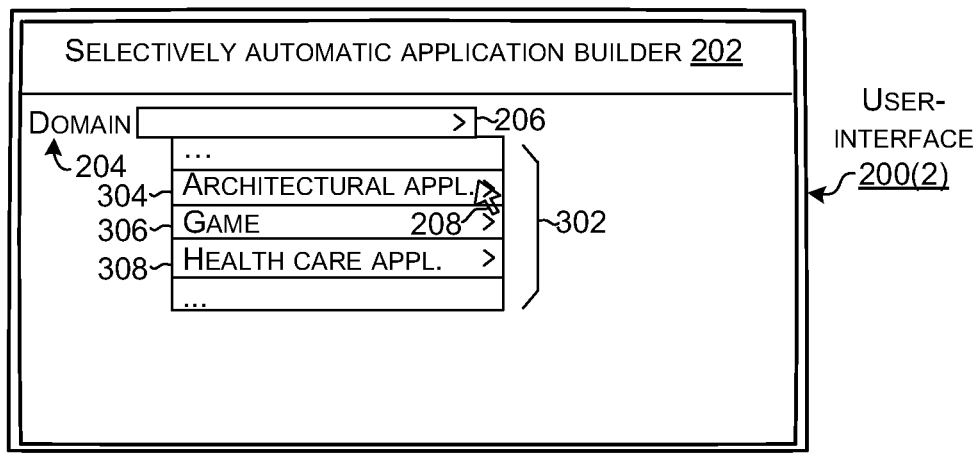

FIG. 3 shows a subsequent user-interface 200(2) that shows a partial listing of available domains at 302. In this example, the listed domains include architectural applications at 304, games at 306, and health care applications at 308. (Of course this listing of domains is provided for purposes of explanation and is in no way intended to be limiting or inclusive of domains that are available in other implementations).

The selectively automatic application builder 202 can allow the user to choose a level of abstraction for a selected domain. For instance, assume for discussion purposes, that the user is interested in building an architectural application and positions the cursor 208 over the architectural applications domain 304. Responsive to the cursor position, the selectively automatic application builder 202 can allow the user to select from multiple levels of abstraction as can be seen in FIG. 4.

Figure 4:
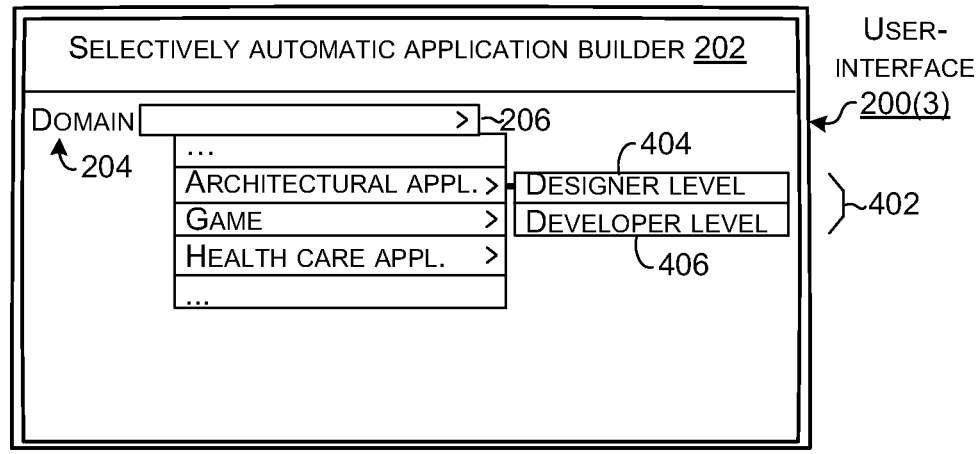

FIG. 4 shows a user-interface 200(3) that offers two levels of abstraction to the user at 402 relative to designing an architectural application. In this case, the user is offered the option of working at a designer level 404 or at a developer level 406. Briefly, designer levels tend to be more abstract and hence more automated. In contrast, developer levels tend to be less abstracted and allow more user control. Assume for purposes of explanation that the user selects to build at the designer level 404.

Figure 5:
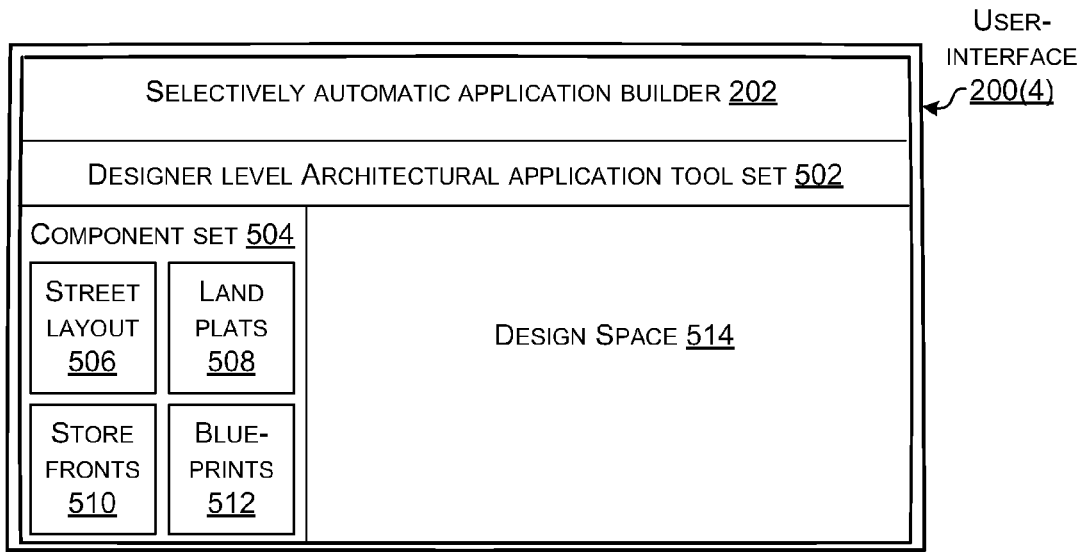

FIG. 5 shows a user-interface 200(4) generated responsive to the user action described above relative to FIG. 4. In this example, user-interface 200(4) relates to a designer level architectural application tool set 502 that offers the user a set of components 504. The set of components correlate to the user-selected domain and level of abstraction. In this example, the set of components 504 includes a street layout component 506, a land plats component 508, a storefronts component 510 and a blue prints component 512. The user can select components from the set of components for use in a design space 514. For instance, the user can drag individual components into the design space. The user can define interactions between the components to create the application. This aspect will be described in more detail below relative to FIGS. 11-21.

Second Example of Unifying Application Building

Figure 6:
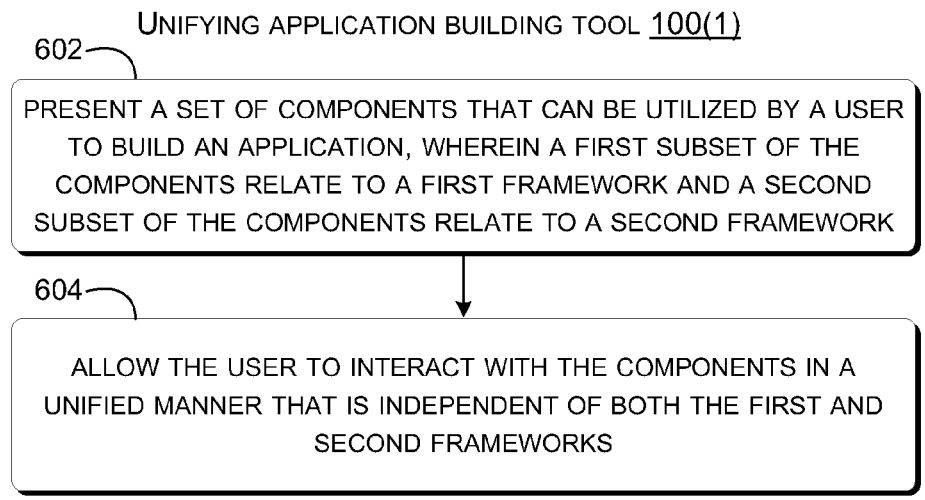
FIG. 6 shows an example of a method for implementing unified application building concepts in accordance with some implementations of the present concepts.

FIG. 6 offers another example of some of the present concepts in the form of a unifying application building tool 100(1). In this example, unifying application building tool 100(1) can present a set of components that can be utilized by a user to build an application at block 602. In some cases, a first subset of the components can relate to a first framework and a second subset of the components relate to a second framework. The set of components can relate to any type of domain that might be of interest to a user.

The process can create the set or components from any number of sources to create a library of components that may be useful to the user. For instance, the first set of components may be from a first source and utilize a first framework while the second set of components may be from a second source and utilizes and a second framework. One manifestation of block 602 is described below in relation to FIG. 7.

Block 604 can allow the user to interact with the components in a unified manner that is independent of both the first and second frameworks. This configuration can offer the user a wide selection of various components to utilize in building an application. Yet, the user's learning curve can be reduced since the user does not need to learn to interact with the different frameworks. One manifestation of block 604 is described below in relation to FIGS. 8-9.

It is worth noting that the ability to be isolated from the particular framework can give the application the ability to run on different OS platforms. For instance, in some implementations, the application can be run on any OS platform that can support at least one of the frameworks that the unifying application building tool is built upon.

In summary, the unifying application building process can provide a generic manner for interaction with a set of components rather than relying on component-specific frameworks, such as the first framework or the second framework.

The order in which blocks 602 and 604 are described is not intended to be construed as a limitation, and any number of the described blocks can be combined in any order to implement the method or process, or an alternate method. Furthermore, the process can be implemented in any suitable hardware, software, firmware, or combination thereof, such that a computing device can implement the process. In one case, the process is stored on a computer-readable storage media as a set of instructions such that execution by a computing device causes the computing device to perform the process.

Second Example of a Unifying Application Building User-Interface

Figure 7:
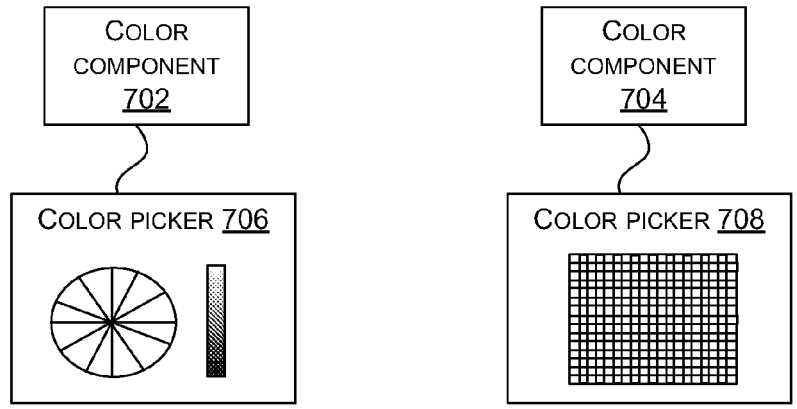
FIG. 7 shows an example of two components that can be utilized with unified application building concepts in accordance with some implementations of the present concepts.

FIG. 7 shows two color components 702 and 704. Assume for purposes of explanation that the color components are from different sources and/or rely upon different frameworks. For instance, color component 702 can be produced by hypothetical company ABC, while component 704 can be produced by hypothetical company XYZ. Further, if the user wants to define a color utilizing color component 702 the user can utilize a color picker 706 supported by the framework associated with color component 702. Similarly, if the user wants to define a color utilizing color component 704 the user can utilize color picker 708 supported by the framework associated with color component 704. Now assume that the color components 702 and 704 are added to a component set or library of a selectively automatic application builder. Such an example is evidenced in FIG. 8.

Figure 8:
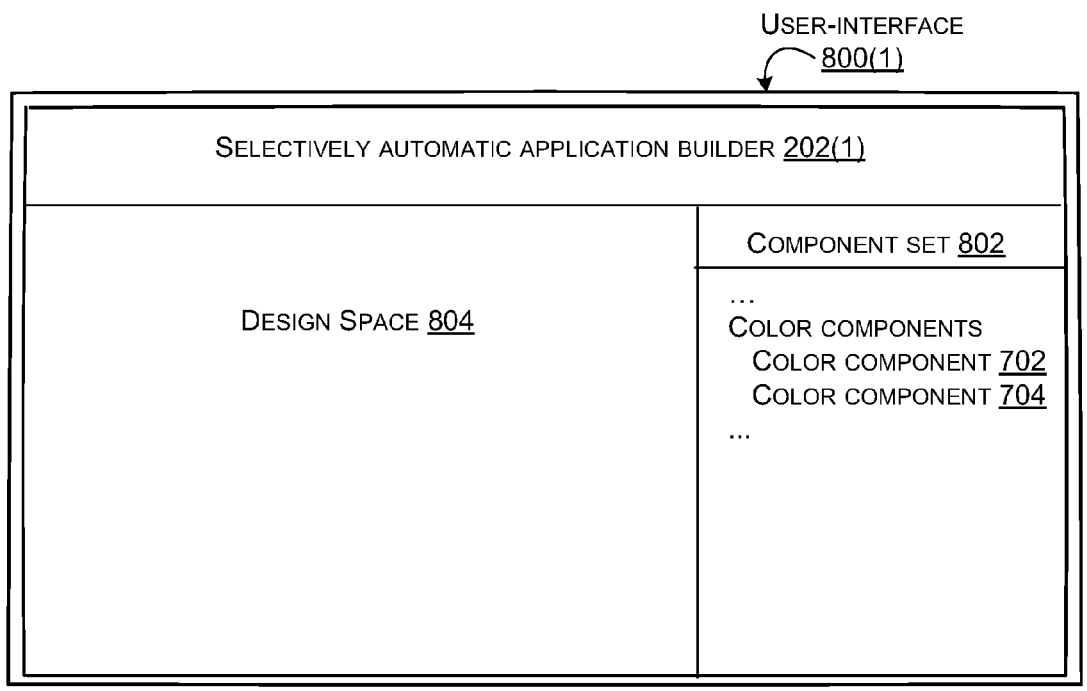
FIGS. 8-21 show user-interface screenshots that can be generated to accomplish unified application building in accordance with some implementations of the present concepts.
Figure 9:
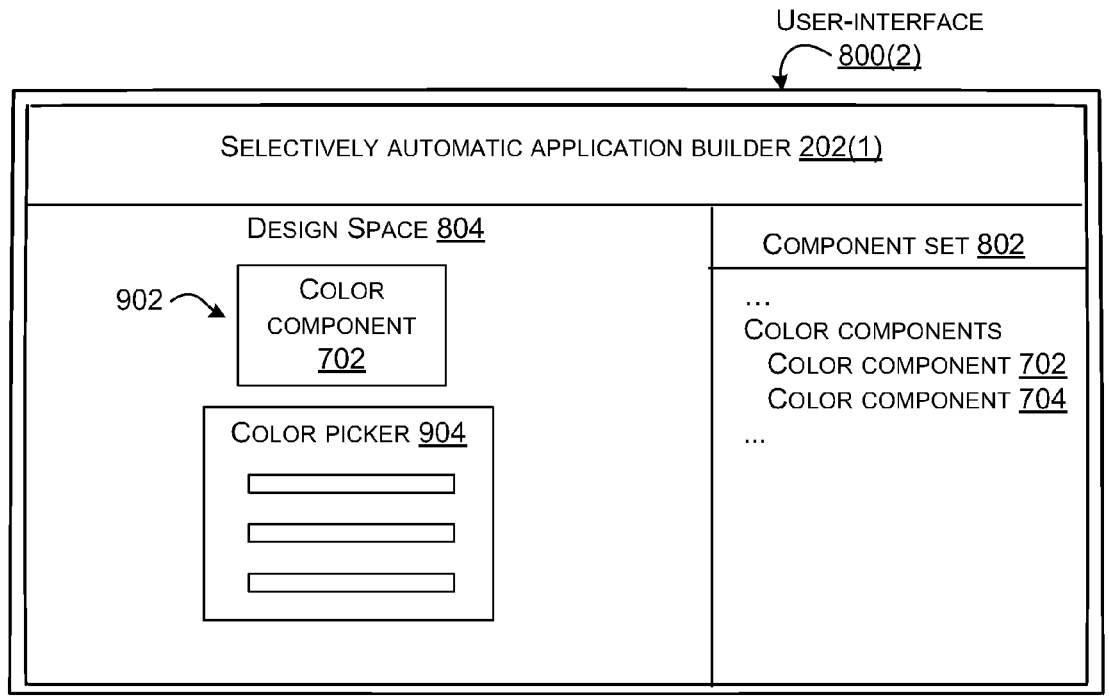
Figure 10:
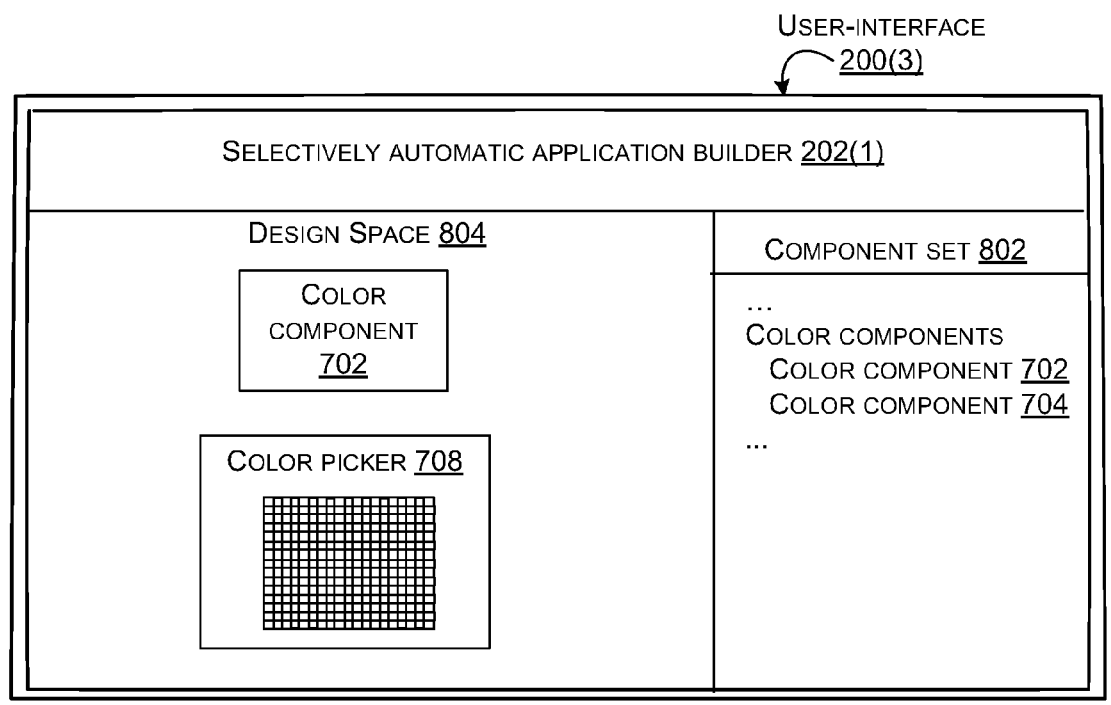

FIGS. 8-10 show user-interfaces 800(1), 800(2), and 803 (3), respectively, that include color components 702 and 704 introduced above in relation to FIG. 7. In this case, the color components 702 and 704 can be included in a component set 802 of a selectively automatic application builder 202(1). Assume for purposes of explanation, that a user wants to utilize color component 702 in building an application. For instance, the user can click his/her mouse on color component 702 in component set 802. In another example, the user can drag color component 702 from component set 802 into design space 804.

FIG. 9 shows user-interface 800(2) with color component 702 represented at 902 in design space 804 responsive to the user-selection described above. However, in this case, selectively automatic application builder 202(1) expresses a unified color picker 904 with color component 702 rather than color picker 706. Recall that as discussed above color component 702 would normally be associated with color picker 706 due to the framework that supports color component 702. In this example, color picker 904 is independent of the framework associated with color component 702. This example illustrates how the selectively automatic application builder 202(1) can provide color picker 904 for any color component in the component set 802 to create a unified experience for the user. This example can be applied to other types of components in component set 802.

Further, some implementations can allow the user to select or customize what color picker he/she wants to utilize. So for instance, if the user is familiar with, and/or likes, color picker 708, then color picker 708 can be presented to the user regardless of which color component the user selects. One such example is illustrated in FIG. 10, which shows user-interface 200(3). In this example, unifying application building tool 202(1) can provide the infrastructure to relay data between a user-selected color picker and the respective color component. In this case, assume that the user has previously specified that he/she would like to use color picker 708. Also assume that the user selected color component 702 from component set 802. The unifying application building tool 202(1) can instantiate color component 702 in design space 804 with color picker 708 (rather than color picker 706 that is associated with color component 702). The unifying application building tool 202(1) can supply underlying infrastructure or framework to allow the user's selections on color picker 708 to be properly received and understood by color component 702. Thus, the user can utilize his/her color picker of choice with any available color component of the component set, without any requiring extra workload for the user.

For sake of brevity the above discussion uses the term "user" in a generic fashion. However, the unifying application building tool 202(1) can dynamically adjust to suit the "user". For instance, early in the application building process, the user may be a "design user". The unifying application building tool can allow the design user to select his/her favorite color picker, say hypothetical "color picker A". The unifying application building tool can then present the favorite color picker component to the design user for his/her building activity.

At a subsequent date the "design user" could tell the unifying application building tool to replace all instances of "color picker A" with "color picker B". For that point forward, the unifying application building tool can present color picker B for all color picking tasks and provides the underlying processes to support the change.

At a further point in time, such as when the build is complete, the design user could give way to the "end user" (i.e., the user running the completed app). The end user could tell the unifying application building tool to use "color picker C" for all color pickers in the application (or a set of applications). Alternatively or additionally, the unifying application building tool can allow the "end user" to take a "color picker D" that he/she found in a first hypothetical application and use it in a second hypothetical application.

Further still, in some implementations, when a completed application is running on hypothetical platform xyz that does not support a specified framework-specific color picker, then the unifying application building tool could substitute another color picker (of equivalent functionality and API).

Of course this same sort of "runtime reconfiguration" could apply to other things. For instance, runtime reconfiguration can be applied to keyboard mappings. For example, consider a scenario where the end user tells unifying application building tool that all "file save" operations in all of his/her applications should be mapped to the "control S" key combination). This can allow applications that are written by a wide variety of companies and developers to adapt to the specific background, knowledge, and preferences of the individual end-user.

In the above examples, the unifying interface supplied by the unifying application building tool 202(1) is described relative to how the user interacts with individual components. The unifying interface can also support other features that can be useful to the user. For instance, the unifying interface can allow debugging to be performed on the user's application (or portions) of the application regardless of the source of the components used in the application. In some configurations, visual debugging can be supported that allows the user to visually track the performance of the various components. So for instance, a visual representation can be created of the performance of individual components as well as another representation that shows the flow between components. In some cases, real-time dynamic representations of the debugging process can be presented on the user-interface for the user. Since the representations can reflect real-time dynamic changes as the debugging progresses, the representations may appear animated. As such, the real-time representations can be thought of as debugging animations.

To summarize, the unifying application building tool 202(1) can offer abstraction-level dependent visualization and animations of the application's components, (visualizing the data associated with the component interfaces ("pins") as well as the interactions between components.

Third Example of a Unifying Application Building User-Interface

FIGS. 11-21 show a series of user-interface screenshots that can be generated during a unifying application building process in some implementations. When viewed collectively, FIGS. 11-21 offer an example of features that some unifying application building tools can provide to a user in building an application. In FIGS. 11-21, a suffix (i.e., (1), (2) . . . etc.) is utilized to distinguish the individual user-interfaces.

Figure 11:
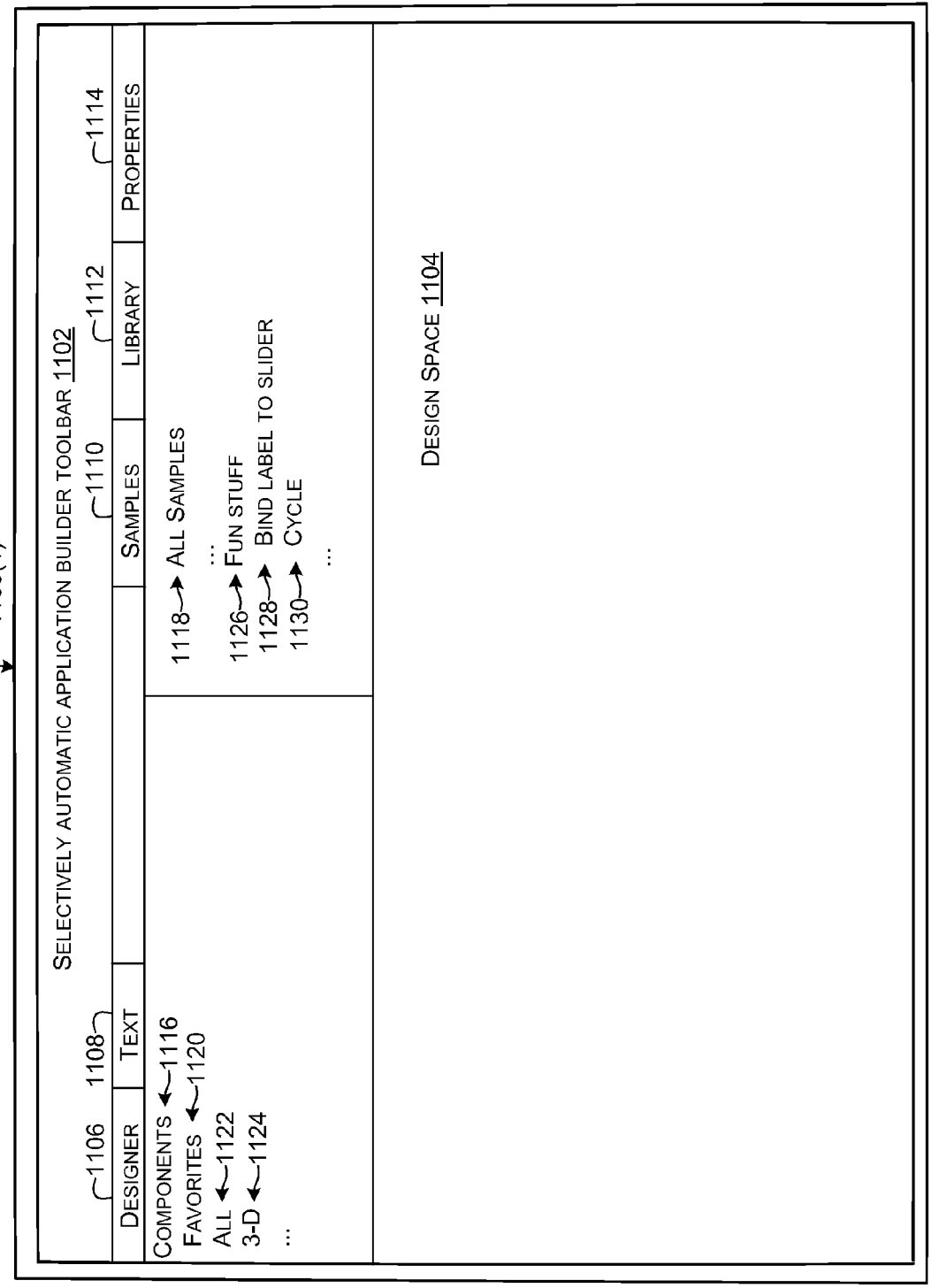

FIG. 11 shows an initial user-interface 1100(1) that offers a toolbar 1102 and a design space 1104. In this case, toolbar 1102 includes a designer tab 1106, a text tab 1108, a samples tab 1110, a library tab 1112, and a properties tab 1114. Assume that a component heading 1116 is presented responsive to a user-selection of the designer tab 1106. Similarly, assume that a listing of samples is presented at 1118 responsive to the user selecting samples tab 1110. In this example, the set of components list includes favorites at 1120, all at 1122, and 3-D at 1124. (Please note that abbreviated listings of components and samples are used in the illustrated examples due to the physical constraints of the drawing page). The "all samples" 1118 includes a "fun stuff" category 1126. The fun stuff category includes a listing for "bind label to slider" at 1128 and a "cycle" listing at 1130. Assume for purposes of explanation that the user wants to select components from his/her favorites 1120. The user can double-click on favorites 1120 to see components listed therein.

Figure 12:
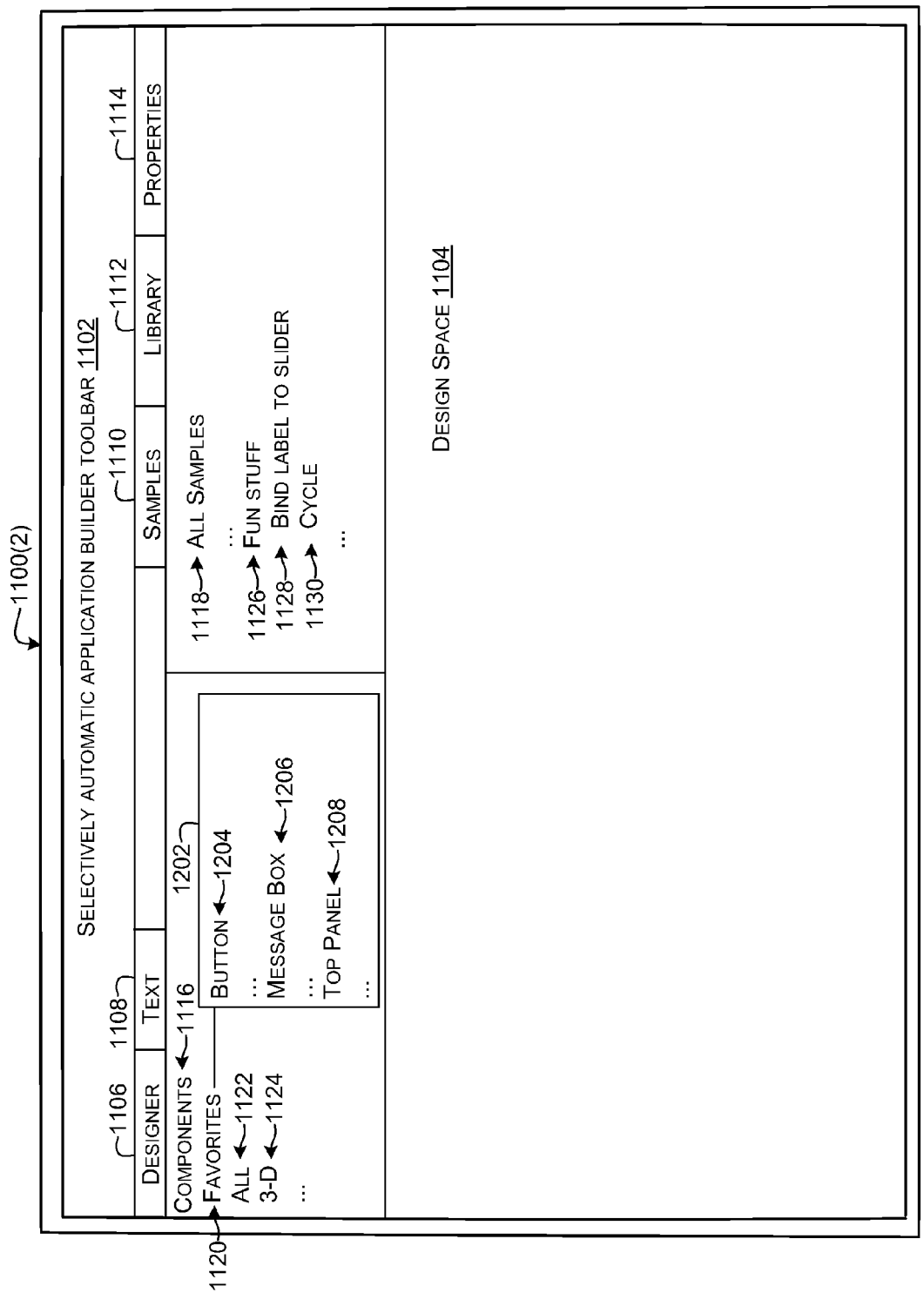

FIG. 12 shows a user-interface 1100(2) that includes a component listing 1202 of the user's favorites 1120. In this case, the component listing includes a button 1204, a message box 1206, and a top panel 1208. Assume that the user selects top panel 1208.

Figure 13:
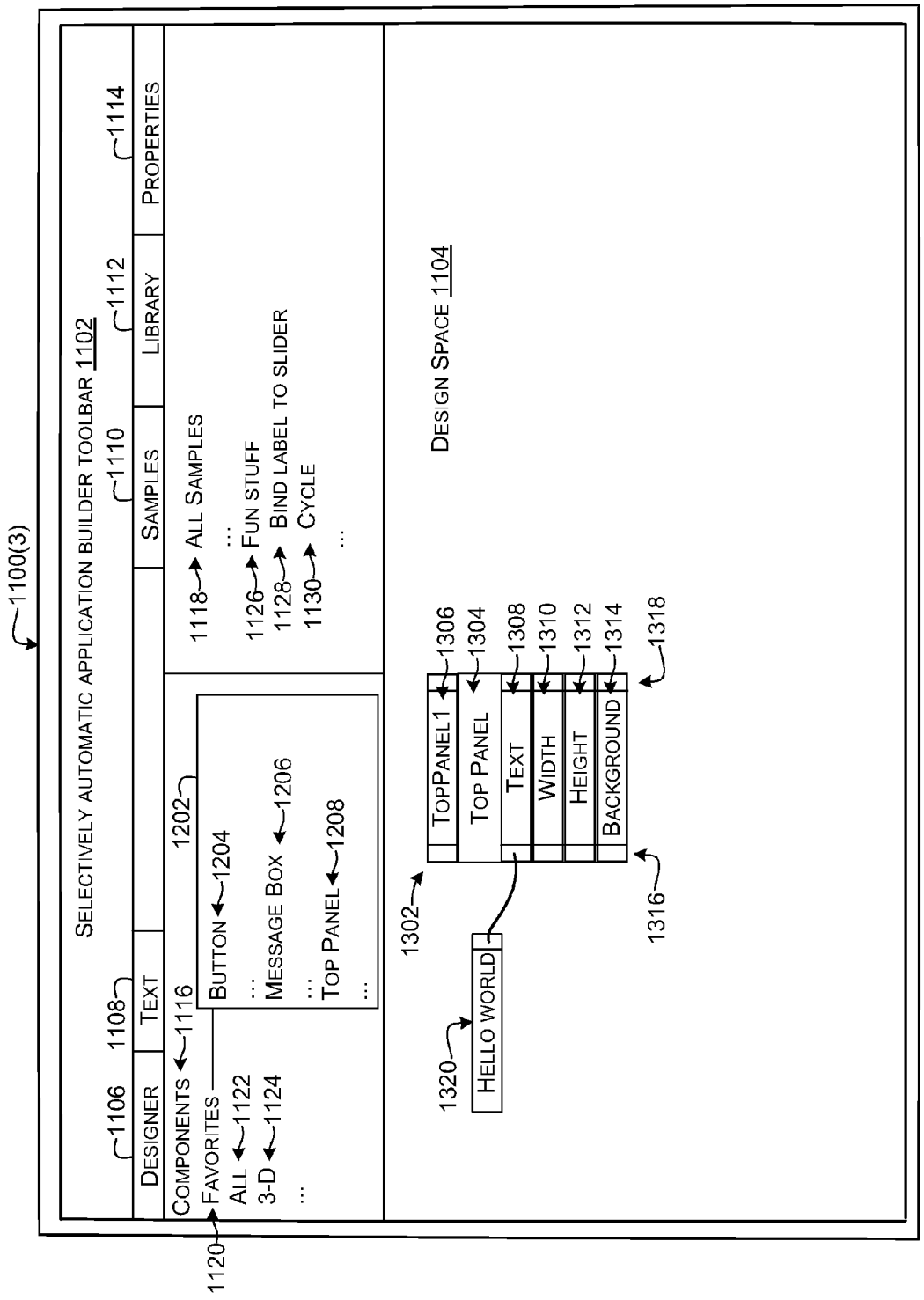

FIG. 13 shows user-interface 1100(3) with a top panel component 1208 instantiated in design space 1104 at 1302 responsive to the user selection of top panel 1208 in FIG. 12. The top panel component is identified by component type at 1304, a name "toppanel1" of the component is indicated at 1306. Four properties are listed for this component. A text property is indicated at 1308, a width property is listed at 1310, a height property is listed at 1312, and a background property is listed at 1314. Inputs to the properties 1308-1314 are indicated generally at 1316 (the left edge of each property). Outputs from the properties 1308-1314 are indicated generally at 1318 (the right edge of each property). Text is shown at 1320 that serves as input to the text property 1308. Assume for purposes of explanation that the user set text 1320 as "hello world window". In some implementations, the user can check the progress of the application at any time during the building process simply by running the application. For instance, the user may use a run command (not shown) in the selectively automatic application builder toolbar 1102 or some other run command.

Figure 14:
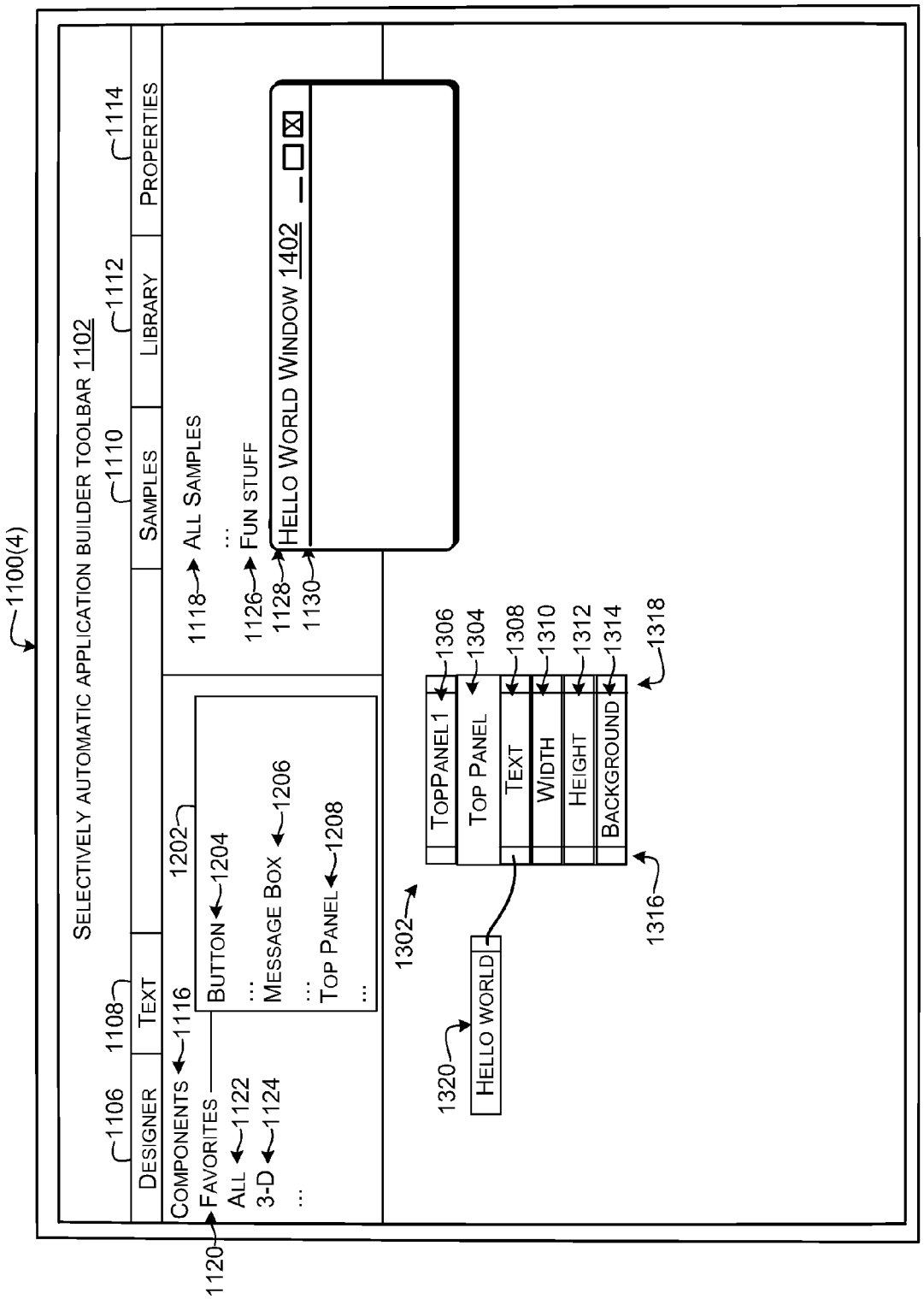

FIG. 14 shows user-interface 1100(4) at run time. User interface 1100(4) includes a hello world window 1402 generated by the user's application. The user can confirm that the application build is progressing as intended and then close window 1402.

Figure 15:
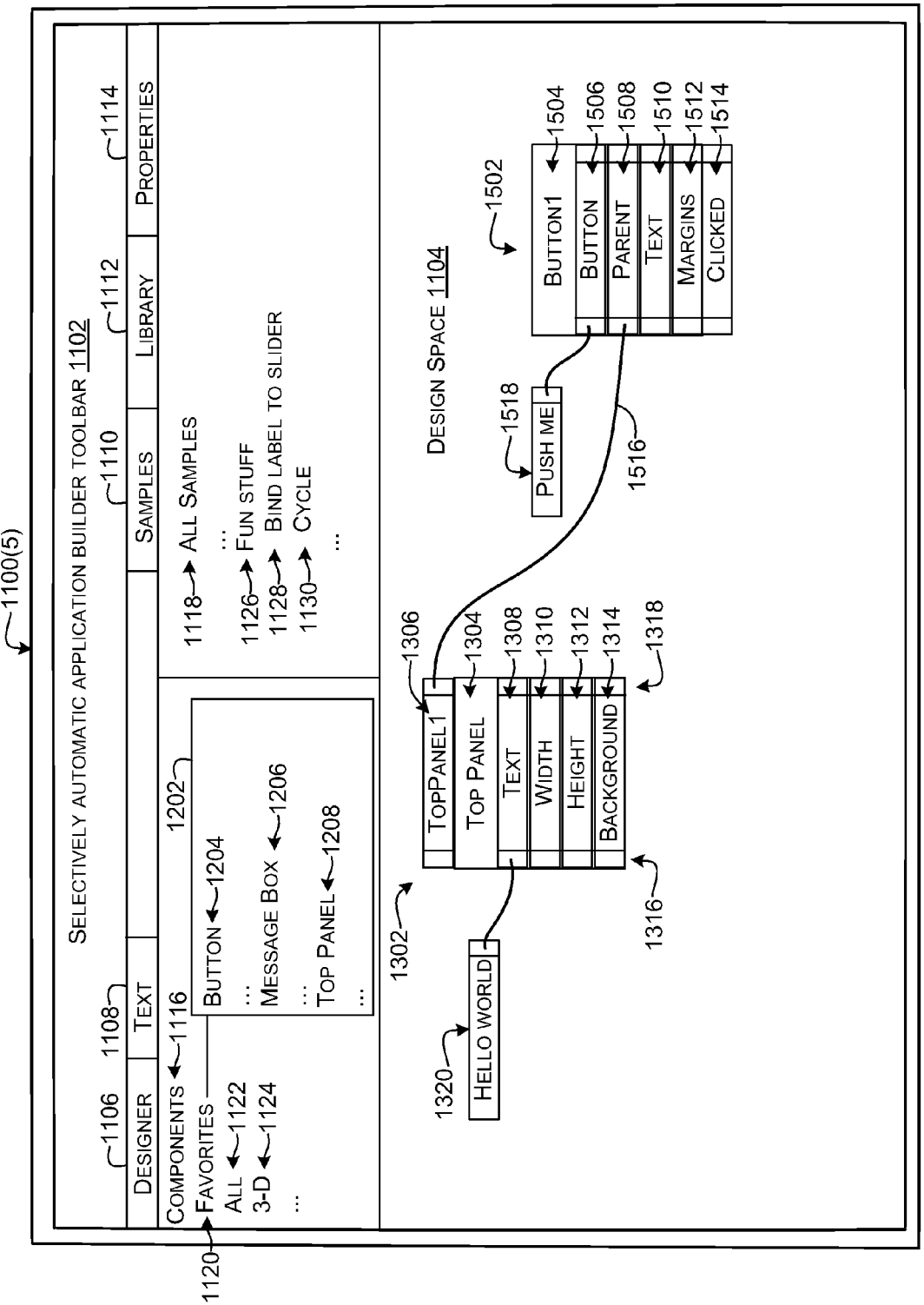

FIG. 15 shows another user-interface 1100(5) where the user has selected button component 1204 and the button component has been instantiated at 1502 in the design space 1104. The button component 1502 includes a button name of "button1" at 1504, a button property 1506, a parent property 1508, a text property 1510, a margins property 1512, and a clicked property 1514. Button component 1502 is automatically linked to top panel component 1302 via a link 1516 between an output of the top panel component's name property and an input of the button component's parent property 1508. Assume that the user has customized content for the button to read "push me" at 1518 as input for button property 1506.

Figure 16:
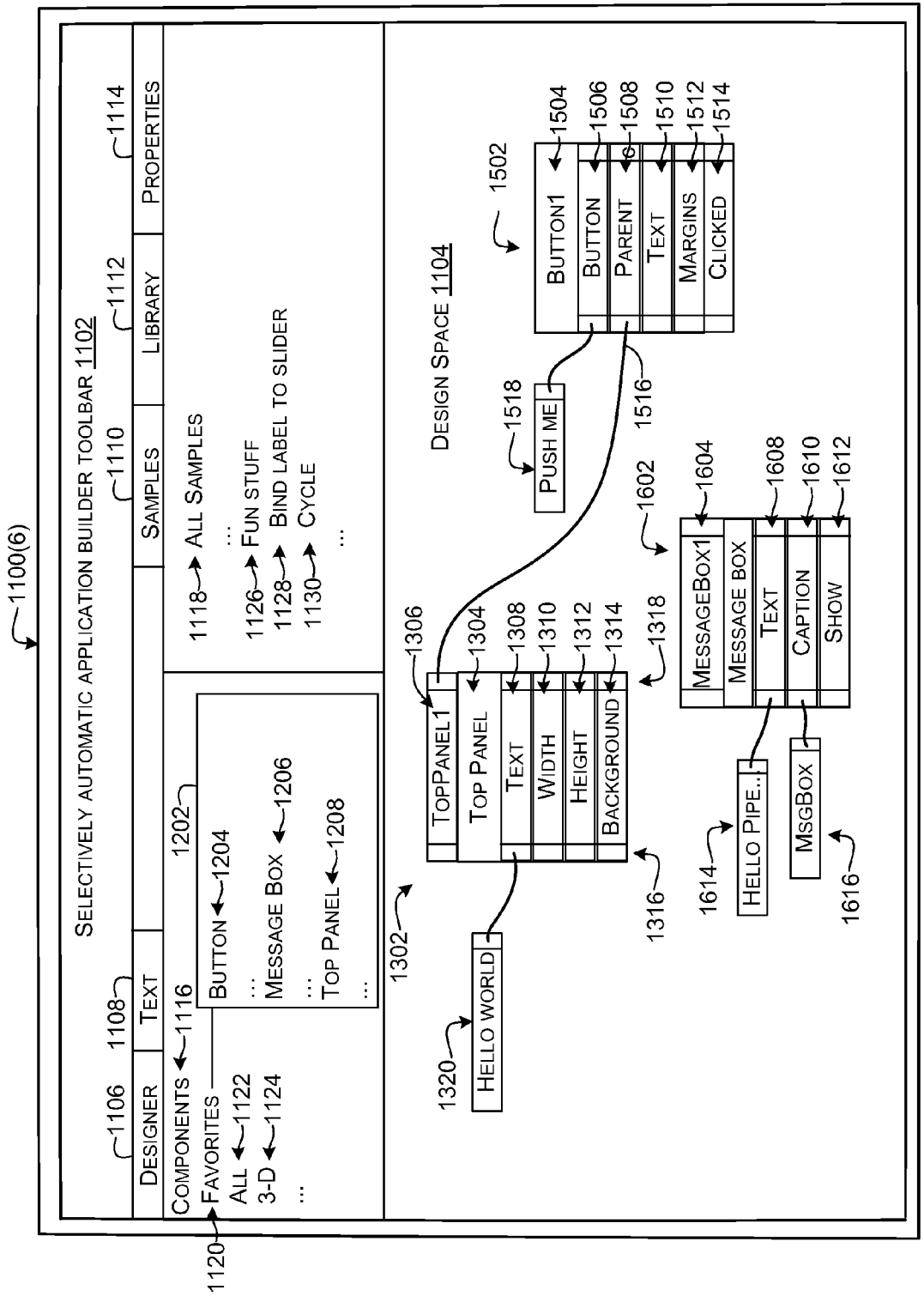
Figure 17:
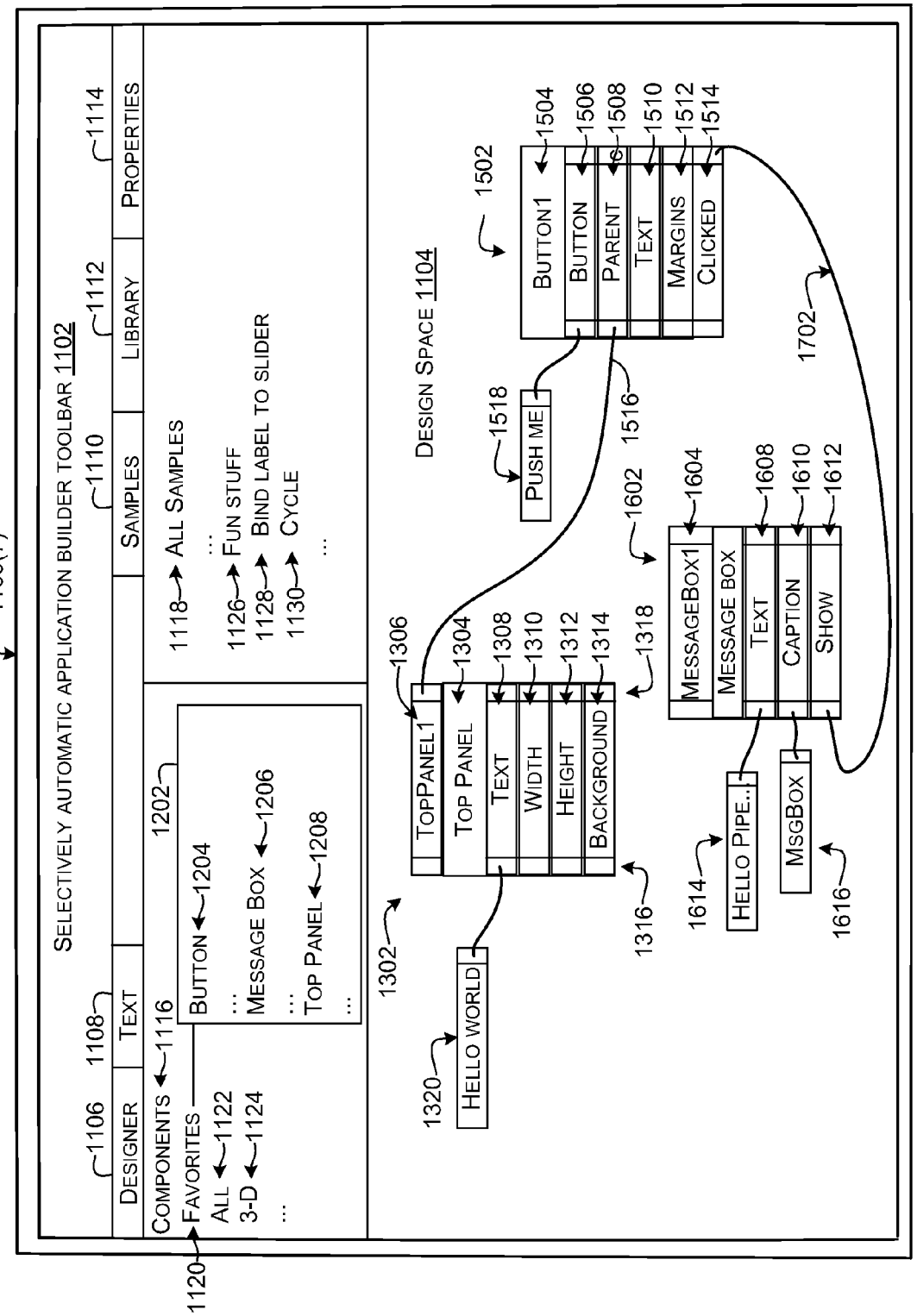

FIG. 16 shows a subsequent user-interface 1100(6) generated responsive to the user selecting message box 1206 from the list of favorite components 1120. In this case, the message box is instantiated in design space 1104 at 1602. The message box component is named "message box 1" at 1604, and includes text, caption, and show properties at 1608, 1610, and 1612, respectively. The message box includes text input 1614 that the user has defined as "hello pipedream". The user has also specified the input of caption 1610 as "msgbox" at 1616. The user can link output of the button's clicked property 1514 to an input of show property 1612 as indicated in FIG. 17 at 1702. The user can run the application and view the results as seen in FIGS. 18-19.

Figure 18:
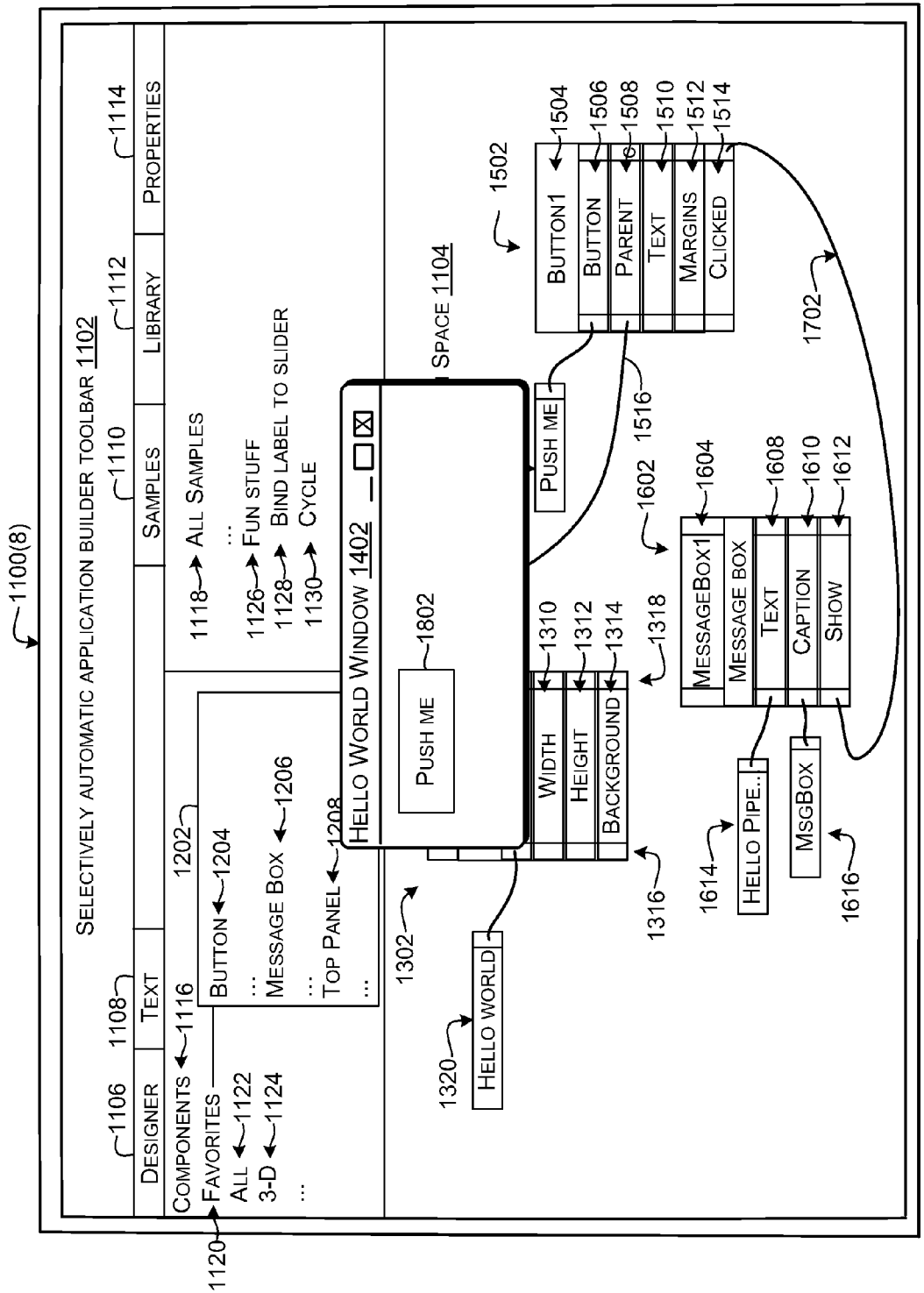

FIG. 18 shows a subsequent user-interface 1100(8) at run time. User-interface 1100(8) includes hello world window 1402 which now includes a push me button 1802. The push me button results from button component 1502. When the user pushes the push me button 1802, another window is generated as can be seen in FIG. 19.

Figure 19:
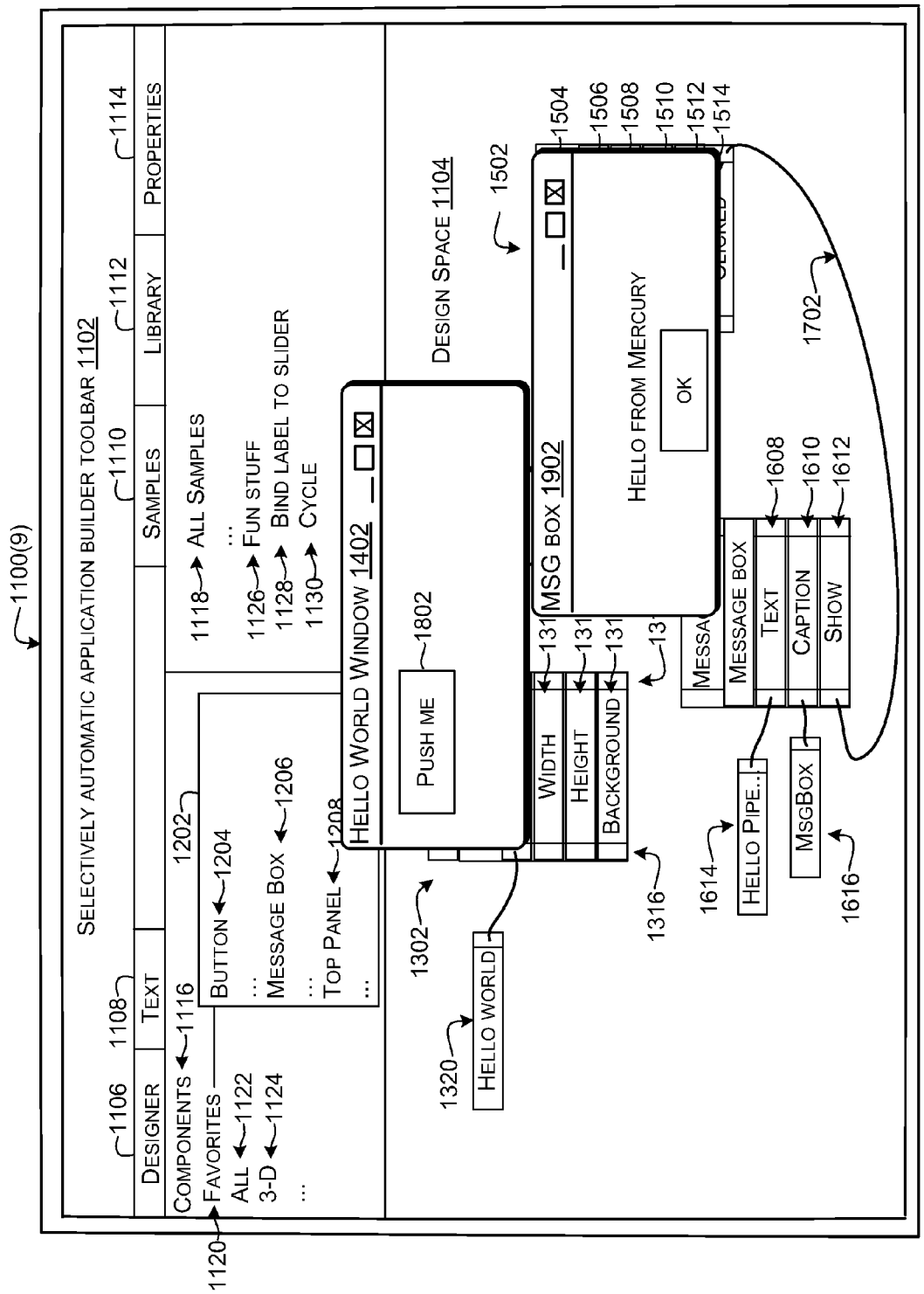

FIG. 19 shows user-interface 1100(9) that adds message box 1902 that is generated responsive to the user clicking on the push me button 1802. Recall that the input of the message box's show property 1612 is connected to the output of clicked property 1514. If the user is satisfied with the application (i.e., the components in design space 1104), the user can name the application and add it to samples 1110.

Figure 20:
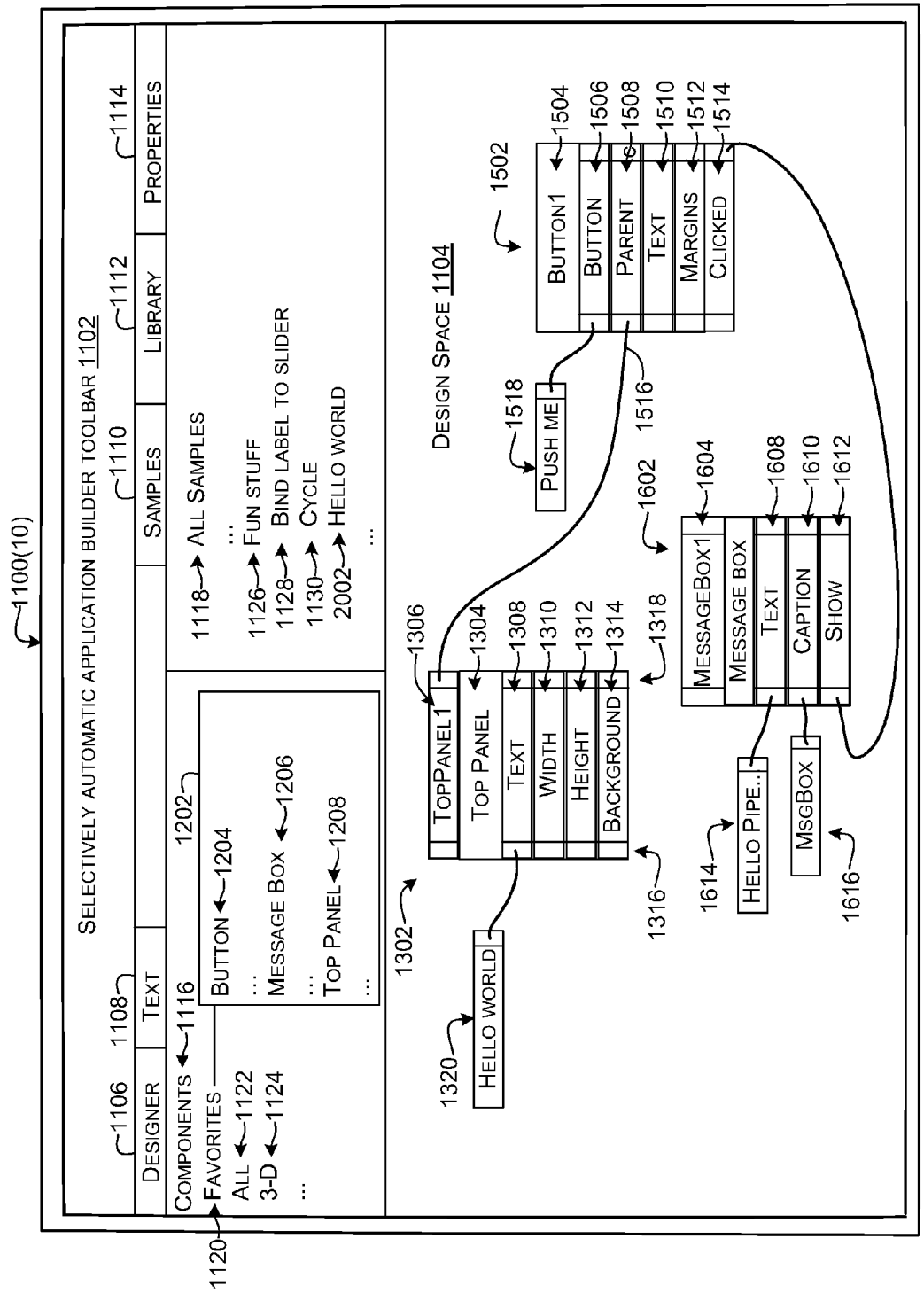

FIG. 20 shows another user-interface 1100(10) where the application is now listed as "hello world" at 2002 under samples 1110.

As mentioned previously, FIGS. 11-20 relate to user-interfaces generated under the designer tab 1106. In some implementations, the underlying selectively automatic application builder can write code that corresponds to the user selected components. The user can view the corresponding code during the application building process. Assume for purposes of explanation that the user wants to view the code that corresponds to the components shown in FIG. 20. The user can select the text tab 1108 to view the corresponding text. Such a view is shown in FIG. 21.

Figure 21:
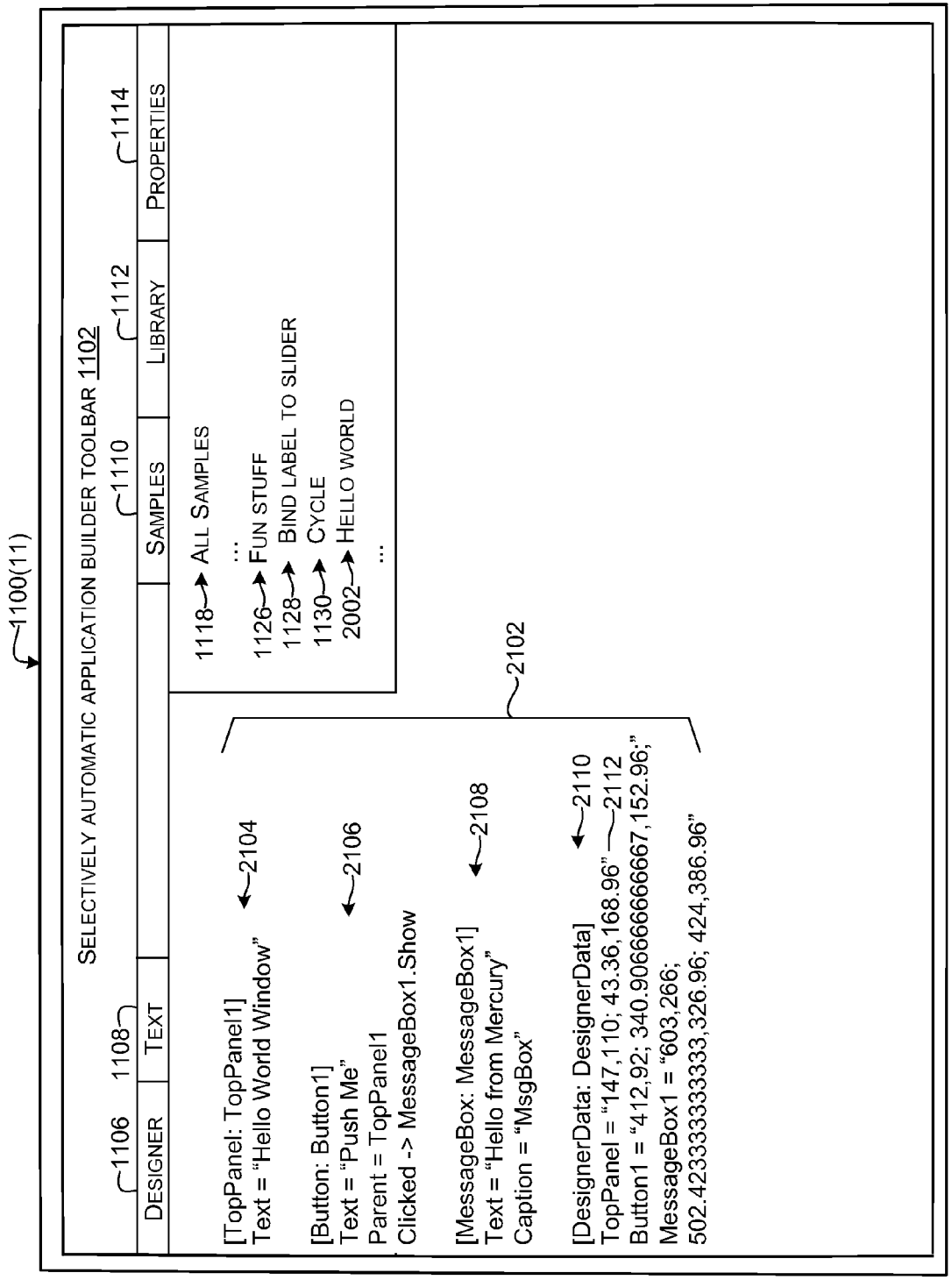

FIG. 21 shows another user-interface 1100(11) where the user has selected text tab 1108. In this case, underlying selectively automatic application builder has generated and is now displaying code or text indicated generally at 2102 that corresponds to the visual representation within design space 1104 of FIG. 20. Briefly, text at 2104 relates to the top panel component 1304 of FIG. 20, text at 2106 relates to button component 1502 of FIG. 20 and text at 2108 relates to message box component 1602 of FIG. 20. Text 2110 relates to designer specific placement properties of the above described components. The textual representation can offer greater detail or granularity than is visible in the visual designer representation. For example, text can show all properties, settings, and bindings, whereas some of these might be hidden in the visual designer (to help support multiple levels of abstraction). In a specific example, line 2112 describes the location and size of the top panel component.

Any changes that the user makes to the code or text can be automatically reflected in the visual component representation (and vice-versa) by the underlying selectively automatic application builder. For instance, if the user makes changes to the text 2102, the user can click on designer tab 1106 to see the corresponding changes to the components in the design space. More detail regarding one way of implementing the text is described below under the heading "Flow language details".

From one perspective, the designer tab 1106 and the text tab 1108 can be thought of as offering two different levels of application building abstraction to the user. For instance, if the user wants a higher level of abstraction, then the user can work in the designer tab. If the user comes to a point in the application build where he/she wants more granularity (i.e., less abstraction), such as to have more precise control, then the user can switch to the text tab. The user can review and/or change the text to his/her satisfaction and then return to the designer tab if desired. In this case, a single user-input, in the form of a mouse click on either the designer tab 1106 or the text tab 1108, can allow the user to switch between the visual designer and textual representations. For the sake of brevity, only a few views are shown in the accompanying drawings. The skilled artisan should recognize that many other views are possible and effective with the present concepts. For example, there can be a 3rd "UI" view, where the design user sees the windows and controls as the end user would see them.

In summary, the above described user-interfaces can allow a single user to design and build an application at his/her desired level of abstraction. The user-interfaces also present application building tools in a unified manner that is easier for the user to learn and interact with. The concepts presented in these examples can allow a single user to design and develop an application from start-to-finish and thereby avoid the shortcomings of traditional scenarios where the designer hands the project off to a developer who may or may not share the designer's vision. Stated another way, the present implementations can allow the developers to "hand off" components to the designers. The designers can own the final working code UX.

Example of a Unifying Application Building Architecture

Figure 22:
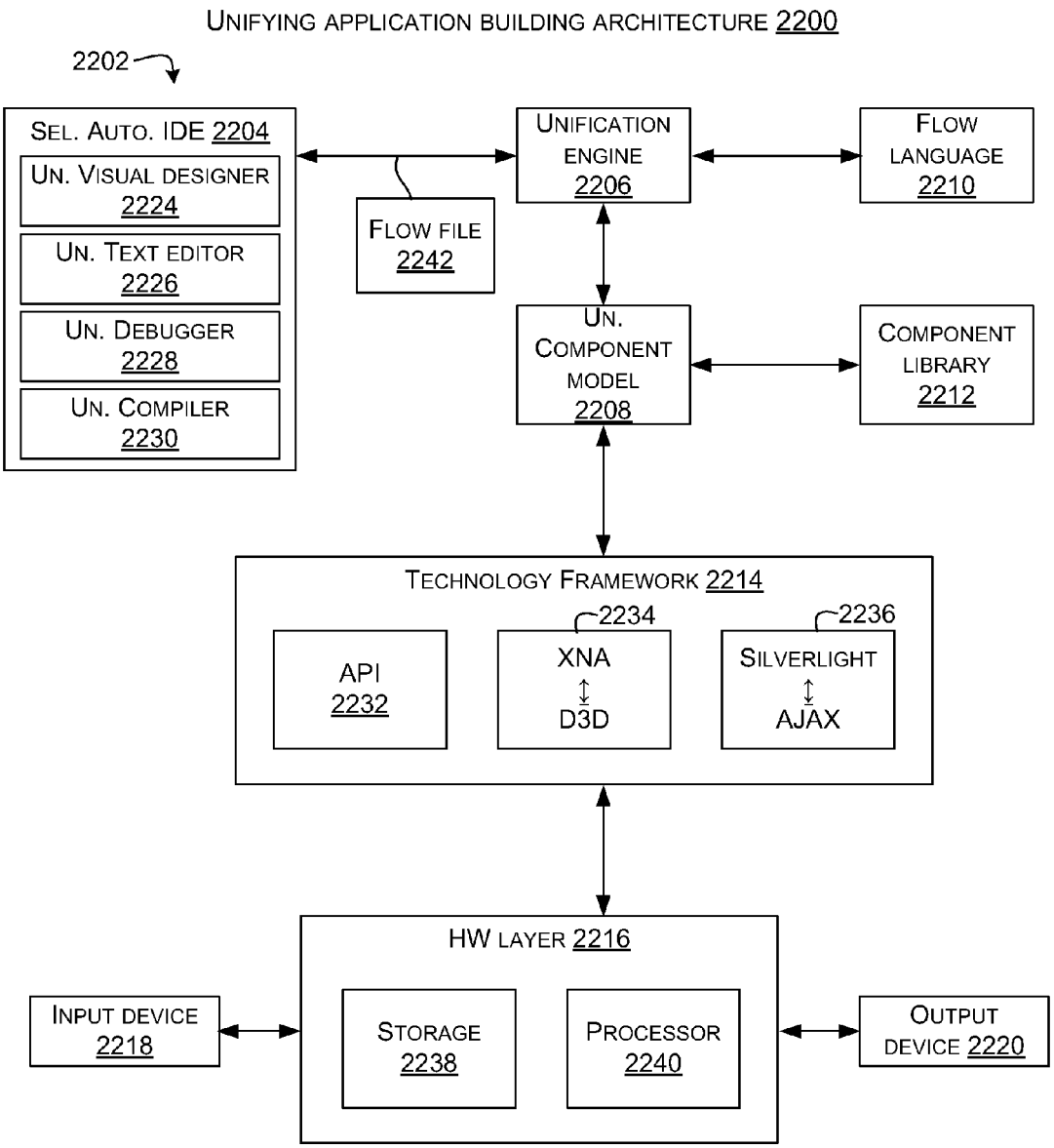
FIG. 22 shows an example of an architecture that can support unified application building concepts in accordance with some implementations of the present concepts.

FIG. 22 shows an example of a unifying application building architecture 2200 that can generate the user-interfaces described above in relation to FIGS. 2-5 and 8-21. In this implementation, unifying application building architecture 2200 includes unifying application building tool 2202. The unifying application building tool 2202 can include a selectively automatic IDE 2204, a unification engine 2206, and a unifying component model 2208. The unifying application building architecture 2200 also includes a flow language 2210, a component library 2212, technology frameworks 2214, a hardware layer 2216, an input device(s) 2218, and an output device(s) 2220.

In this implementation, the selectively automatic IDE 2204 includes a unifying visual designer 2224, a unifying text editor 2226, a unifying debugger 2228, and a unifying compiler 2230.

In this implementation, the technology frameworks 2214 include one or more application program interfaces (APIs) 2232. In this example, one API is represented at 2234 between XNA and D3D. Another API is represented at 2236 between Silverlight and AJAX. The skilled artisan should recognize other configurations. Also, in this implementation, hardware layer 2216 includes storage 2238 upon which computer-readable instructions can be stored and a processor(s) 2240 for executing the computer-readable instructions.

The selectively automatic IDE 2204 hosts unifying visual designer 2224, unifying text editor 2226, unifying debugger 2228, and unifying compiler 2230. Viewed from a different perspective, the unifying visual designer 2224, unifying text editor 2226, unifying debugger 2228, and unifying compiler 2230 support different features of the selectively automatic IDE 2204 that can be utilized by the user in the application building process.

For purposes of explanation, a user can build an application utilizing the unifying visual designer 2224. The selectively automatic IDE's unifying text editor 2226 can generate a corresponding flow file 2242 for the user's application. The unifying debugger can allow the user to view the progression of the application during execution. In some instance, the unifying debugger can provide a visual interpretation of the results produced by the application as it runs. Alternatively or additionally, the unifying debugger can show the progression from component to component as the program executes.

Flow file 2242 is communicated from the selectively automatic IDE 2204 to the unification engine 2206. At run time, unification engine 2206 runs the flow file 2242 in light of flow language 2210. Alternatively, the flow file can be compiled into a developer-oriented language like "C++" or "C#". This can offer several potential benefits. For instance, the compiled flow file can offer faster code execution. The compiled flow file can be a "sealed" deployment package (vs. deploying all the components—needed for some situations). Further, developers can debug the application using their preferred language and toolsets. Finally, this configuration can offer a learning tool for teaching how high level system component usage works, in terms of underlying framework and languages.

Returning to the FIG., as the unification engine 2206 runs the flow file 2242, the unification engine consumes corresponding components from component library 2212 via the standardized interface supplied by the unifying component model 2208. As the unification engine 2206 consumes components it can send instructions to API 2232 in the technology framework 2214 via the unifying component model 2208. Viewed from another perspective, the unifying component model 2208 can provide infrastructure to act as an interpreter between the unification engine 2206 and APIs of the technology framework 2214.

Unifying component model 2208 can also allow the addition of different types of components to the component library 2212. For discussion purposes, the component library can be thought of as an overall set that can include multiple sub-sets of components from different sources. An individual sub-set of components may rely on an underlying framework, such as a particular object model. When viewed in this manner, the unifying component model 2208 can provide a unified object model and underlying infrastructure or framework that can interact with the different sub-sets and their object models as they are added to the component library 2212.

The unifying infrastructure offered by the unifying component model 2208 can allow other components of the architecture and/or the user to interact with the components without knowledge about the components corresponding object model or framework. This configuration can result in reduced overhead for the end user when compared to existing configurations. For instance, in existing systems the user needs to learn the API for any library that he/she wants to use in application building. For instance, Ajax may use one terminology and D3D or Silverlight another set of terminology. The present implementations can provide a common language that allows the user to use any tools in technology framework 2214. For example, several different versions of a common language (for the same set of components) could be created cheaply to match the user's background and expertise level, using the unifying application building architecture's domain authoring tools.

The component library 2212 can include visual 2D controls, 3D objects, data source components, data transform components, and data visualization components. In addition, 3rd party add-in component libraries such as (DLL's) can be defined, such as utilizing .NET classes. Lastly, components can be defined as custom components via unifying visual designer 2224 and/or unifying text editor 2226.

Flow language 2210 can be thought of as a way of defining components. Flow language can also define how components can be bound together to create new components and/or applications. Details of one implementation are described below.

Flow Language Details

As introduced, some of the present concepts can be accomplished utilizing a "flow" language. The flow language can be utilized to build applications in ".flow" file format. Briefly, the ".flow" file can be used to persist the visual design of a user's application. The flow language can utilize categories to characterize components. The three categories are properties, methods, and events. Properties can be named values that effect how the component appears or behaves. Methods can be specific actions that the component can perform. Events can be thought of special messages that the component emits when certain conditions occur. Components can be controlled through instructions associated with these three categories.

A component can be given a "class name" that can be used to identify a component within the component library. When the component is loaded into memory and ready to be used, it is called an "instance" of the component. When the user creates an instance of a component the user gives it a "component name", for later referral. Multiple instances of a single component can be created, but each instance can be given a unique name.

Some implementations can use public methods but these implementations may not take parameters (they can use properties for this purpose) and they return their value through an "Output" type property. The primary method of a component is usually named "Run" (or "Start" for asynchronous style components like animations).

Flow events can have two values associated with them. First, the "sender" of the event (the object that triggered it). Second, the "value" of the event (data associated with the event). When an event is bound to a property and the event triggers, the property is set to the "value" data of the event.

The flow language can allow users to build applications by creating instances of predefined components, setting their properties, and building "pipes" that bind a "source" member to a "target" member. When a source member "changes", its data is sent thru the "pipe" to the associated target member.

Each line in a flow file can be one of these 4 types:

blank line comment line (a line starting with a ";" character)

section line (used to create a component)

property line (used to set properties of the current component).

Sample File

Below is a simple example of a ready-to-run flow file:

```
;---- "test" applet ----
[Panel: mainPanel]
Size = 100, 30
Background = Yellow ;      make it stand out
```

The first line of the sample is a comment line (comments are ignored by the unification engine 2206). The second line of the sample is a blank line. The third line is a section line that creates a "Panel" object named "mainPanel". The forth line is a property line that sets the "Size" property of "mainpanel" to the value "100, 30". The fifth line is a property line that sets the "Background" property of "mainpanel" to the color "Yellow". It also contains an "end of line comment", denoted by the character.

Details Regarding Section Line

The syntax of a normal section line is:

"["<class name> ":"<component name> "]"

where <class name> is the name of the component class (within the component library) to be created. The component can be defined in the component library, in an add-in library, or defined by a flow file (in the same directory as the current file, with the name of <class name>.flow). For example, a section could reference a class named "foo" and the file "foo.flow" would define the "foo" class as a custom component.

The property lines appearing after a section line are called the section block. Some section blocks have special semantics including styles and states.

Style components can be thought of as "property bags". The user can set any property and values on them and later apply all relevant property/values to other components. The user can also specify an animation component when applying a style to an object to animate the value changes.

State components can apply their set of global property lines when they are loaded. A global property line is one in which the optional <component name> is specified.

Details Regarding Member Line

There can be five different forms of member lines including:

```
<property member> "=" <constant value>
<source member>   "->" <target member>
<target member>   "<-" <source member>
<source member > "/>" <target member>     ; remove the pipe
<target member > "</" <source member>     ; remove the pipe
<pin name>   "<->"   <target member>            ; create a
"Pin" binding from a name to a real property
```

Examples of Member Lines:

| | |
|---|---|
| Size = 100, 30 | ; sets the "Size" property to the value |
| Width=100, Height=30, | |
| Clicked -> myMsg.Run | ; binds the "Clicked" event of the current component to the "Run" method of "myMsg", |
| Text <- mouse.Over | ; binds the "Over" property of the mouse object to current component's "Text" property. |

The first form, using the "=" operator, does a one-time assignment (at application load time, or state load time if the property line appears in a state block) of a constant value to the specified component property.

The second and third forms bind a source Property, Method, or Event of a component to a target Property Method, of another component. Meanings of each combination are outlined below:

Source Target Meaning

| | | |
|---|---|---|
| P | P | when the source property changes, its value is assigned to the target property |
| P | M | when the source property changes, the target method is called |
| E | P | when the source event is triggered, its parameter value is assigned to the target property |
| E | M | when the source event is triggered, the target method is called |

The syntax of a <property member> is:
[<component name> "."]<property name>

The square brackets "[ ]" mean that the enclosed part is optional. When omitted, the name of the current component (defined by the most recent section line) is used. In the "pins" section block of property lines, <component name> is specified.

A <constant value> can be one of these values:

| | |
|---|---|
| <component name> | (example: myButton) |
| <quoted string> | (example: "hi there") |
| <integer value> | (example: 32) |
| <double value> | (example: 32.5) |
| <Boolean value> | (example: true) |
| <date time value> | (example: 12/15/2007) |
| <enumeration value name> | (example: EaseIn) |
| <color name> | (example: LightBlue) |
| <Point value> | (example: 3, 3) |
| <Vector value> | (example: 13, 0) |
| <Size value> | (example: 300, 200) |
| <font family name> | (example: Tahoma) |
| <font weight> | (example: Bold) |
| <font style> | (example: Italic) |

A <source member> is defined as:

| |
|---|
| [ <component name> "." ] <property or event name> [ "." <property name> ... ] |

The square brackets "[ ]" mean that the elements are optional. So, in the simplest form, a <source member> is just the name of a property or event of the current component.

Optionally, if the property or event value is a component (and not a primitive value), the member name can be further qualified by a property name (which can be repeated as necessary to get to the final target value). For example:
Output.CustomerName->myText.Label
In the above example, the "Output" event on the current component returns a record with several properties, one of them being "CustomerName". This example binds that CustomerName field/property to the Label property of myText. This means, when the "Run" method is called and returns a value, myText.Label is set the CustomerName property within that value.

A <target member> is defined as:
<component name> "."<member name>.

The above flow language description can allow use of the flow language in the context of unifying application building and/or or scenarios. The flow language can be easier to use than existing languages. Alternatively or additionally, functionalities can be described with flow language utilizing fewer characters of text than existing technologies.

Example of a System Configuration

Figure 23:
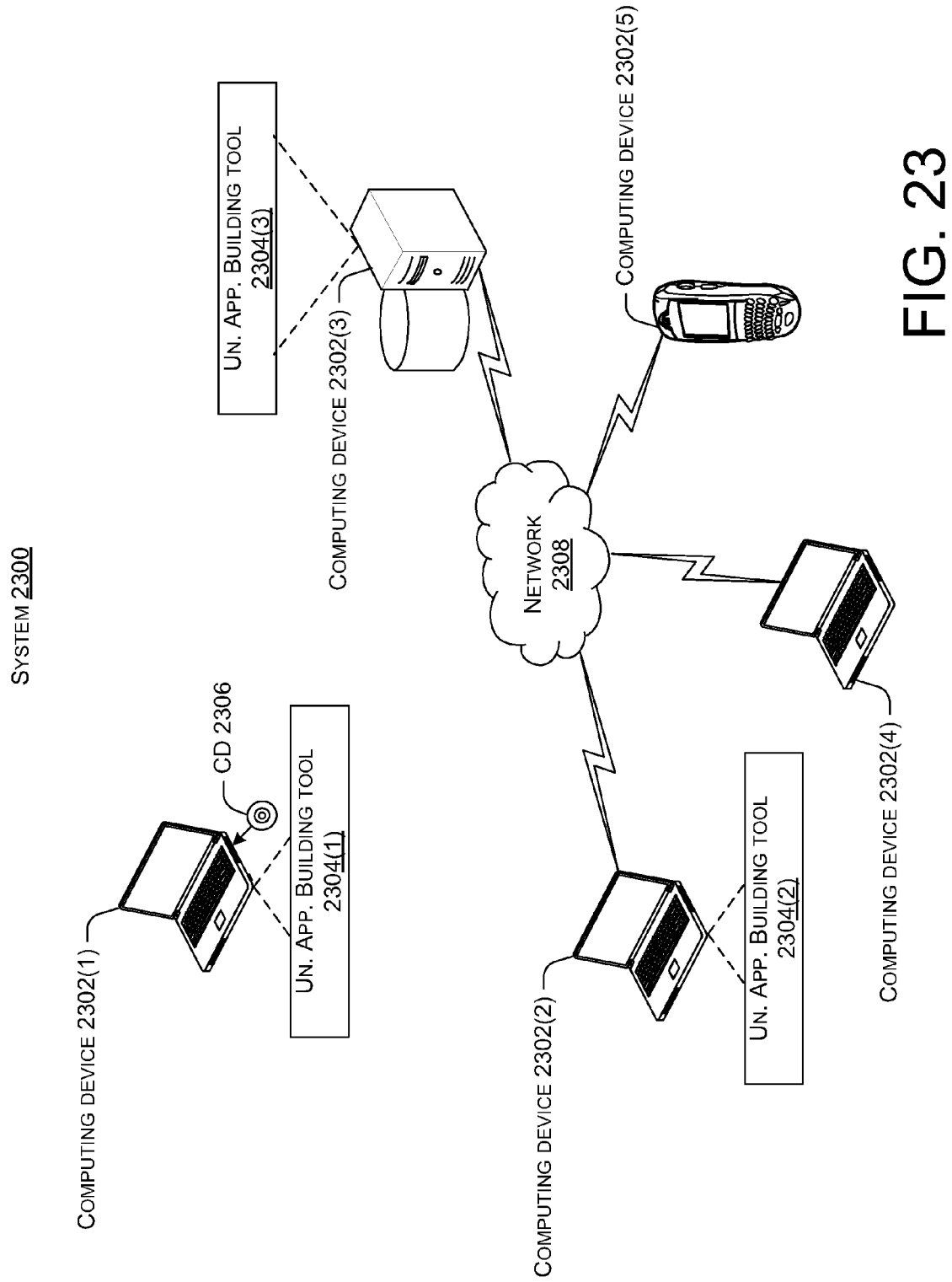
FIG. 23 shows an example of a system on which unified application building concepts can be manifested in accordance with some implementations of the present concepts.

FIG. 23 shows a system 2300 in which unifying application building can be employed. System 2300 includes five computing devices 2302(1), 2302(2), 2302(3), 2302(4), and 2302 (5). In this case, computing device 2302(1) is a free-standing computing device that includes a unifying application building tool 2304(1). A user of computing device 2302(1) can utilize unifying application building tool 2304(1) to build applications. Alternatively or additionally, the user can utilize unifying application building tool 2304(1) to build components for a library of components for the building tool. In some instances, computing device 2302(1) can be shipped from the factory with unifying application building tool 2304 (1) installed thereon. In other instances, a user or other party can install the unifying application building tool 2304(1) on the computing device such as from a computer-readable storage media. For example, a compact disc (CD) 2306 can have a copy of the unifying application building tool stored on the CD which can be installed on computing device 2302(1). Of course, CD 2306 is but one non-limiting example of a means for distributing computer-readable storage media.

In system 2300, computing devices 2302(2)-2302(5) are shown communicatively coupled via a network 2308, such as the Internet. In this case, computing device 2302(2) can perform a client role and computing device 2302(3) can perform a server role. A user of computing device 2302(2) may want to build an application utilizing unifying application building techniques. As such, the user may install unified application building tools 2304(2) on his/her computing device 2302(2). Alternatively, the user may utilize unified application building tools 2304(3) running on server computing device 2302 (3). In still a further implementation, some of the functionality of the unifying application building techniques may be performed on the server computing device 2302(3) and some of the functionality may be performed on client computing device 2302(2) by installing a portion of the tools on each computing device.

Applications that are built utilizing unifying application building techniques can be utilized on the same or other computing devices. For instance, an application generated on computing devices 2302(2) and/or 2302(3) can be loaded on, accessed from, and/or run on computing devices 2302(4) and/or 2302(5). The term computing device, as used herein can apply to personal computers, other types of computers, such as Apple computers or UNIX computer. The term computing devices can also include netbooks, cell phones, smart phones, personal digital assistants (PDAs), cameras, headsets, media players, multifunction wristwatches, and smart appliances, among other ever-evolving types of devices.

Conclusion

Although techniques, methods, devices, systems, etc., pertaining to unified application building concepts are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-readable storage media having instructions stored thereon that when executed by a computing device cause the computing device to perform acts, the acts comprising:
    allowing a user to define a selected domain in which to build an application;
    presenting an interface that provides at least two levels of abstraction to the user, wherein the at least two levels of abstraction comprise a designer level of abstraction where components are presented graphically and a developer level of abstraction where the components are presented textually;
    receiving, via the interface, a user input identifying an individual level of abstraction selected by the user;
    presenting a set of domain-specific components supported by different frameworks having different associated application programming interfaces (APIs), wherein the set of domain-specific components are presented at the individual level of abstraction selected by the user and the user can select individual components from the set to build the application;
    receiving a first user selection of a first domain-specific component supported by a first framework having an associated first API and a second user selection of a second domain-specific component supported by a second framework having an associated second API;
    building the application and including, in the application, both the first domain-specific component supported by the first framework having the associated first API and the second domain-specific component supported by the second framework having the associated second API; and
    executing the application by providing first instructions to the first domain-specific component in accordance with the associated first API and providing second instructions to the second domain-specific component in accordance with the associated second API.

2. The computer-readable storage media of claim 1, wherein the allowing comprises:
    displaying a list of domains, the list of domains including the selected domain; and
    receiving a further user selection identifying the selected domain from the list.

3. The computer-readable storage media of claim 1, wherein the presenting comprises presenting the domain-specific components in a uniform manner that is independent of the different frameworks.

4. The computer-readable storage media of claim 1, the acts further comprising:
    receiving a third user selection of a third domain-specific component supported by a third framework having an associated third API;
    including, in the application, the third domain-specific component supported by the third framework having the associated third API with the first domain-specific component supported by the first framework having the associated first API and the second domain-specific component supported by the second framework having the associated second API; and
    executing the application by providing third instructions to the third domain-specific component in accordance with the associated third API.

5. The computer-readable storage media of claim 1, wherein the first framework is an internet application framework and the second framework is a video game framework.

6. The computer-readable storage media of claim 1, the acts further comprising:
    in a first instance when the individual level of abstraction selected by the user is the designer level of abstraction, displaying graphical representations of the first domain-specific component and the second domain-specific component without displaying first textual code of the first domain-specific component and without displaying second textual code of the second domain-specific component; and
    in a second instance when the individual level of abstraction selected by the user is the developer level of abstraction, displaying the first textual code and the second textual code without displaying the graphical representations.

7. A method performed by a computing device, the method comprising:
    displaying a user interface to a user, the user interface having a design space and a component space, the component space displaying a library of components that can be utilized to build an application, wherein a first one of the components displayed in the component space relies on a first framework and not a second framework and a second one of the components displayed in the component space relies on the second framework and not the first framework;
    receiving user selections in the component space identifying the first component from the library that relies on the first framework and the second component from the library that relies on the second framework;
    responsive to the user selections, displaying, in the design space:
        a first identifier of the first component from the library that relies on the first framework, and
        a second identifier of the second component from the library that relies on the second framework; and
    building the application by binding the first component that relies on the first framework to the second component that relies on the second framework.

8. The method of claim 7, further comprising:
    receiving user inputs specifying levels of abstraction for displaying individual components in the library; and
    displaying the individual components at the specified levels of abstraction.

9. The method of claim 7, further comprising:
    persisting the binding of the first component to the second component in a file that is separate from the first component and separate from the second component.

10. The method of claim 9, further comprising:
    executing the application by:
        reading the file,
        identifying the binding in the file, and
        communicating data from the first component to the second component by interpreting between a first application programming interface of the first component and a second application programming interface of the second component.

11. The method of claim 10, wherein the executing the application comprises detecting that the first component has triggered an event that is bound to the second component and the interpreting comprises instructing the second component to set a value of the second component to a parameter value of the event triggered by the first component.

12. A system, comprising:
one or more processing devices; and
one or more computer-readable storage media storing computer-readable instructions that, when executed by the one or more processing devices, cause the one or more processing devices to:
 receive user inputs specifying a visual design of an application having multiple components, the visual design including a first component that is supported by a first application programming interface (API) and a second component that is supported by a second API that is different than the first API, wherein the first component does not rely on the second API and the second component does not rely on the first API;
 display the visual design to the user, including the first component supported by the first API and the second component supported by the second API;
 bind an event between the first component that is supported by the first API and the second component that is supported by the second API;
 persist the visual design of the application in a file that indicates the event is bound between the first component that is supported by the first API and the second component that is supported by the second API; and
 execute the application by running the file and communicating the event from the first component supported by the first API to the second component supported by the second API,
 wherein the communicating the event from the first component to the second component comprises interpreting between the first API and the second API as the application is running.

13. The system of claim 12, wherein the computer-readable instructions cause the one or more processing devices to execute the application by running the file without compiling the file into a different language.

14. The system of claim 12, wherein the computer-readable instructions cause the one or more processing devices to execute the application by compiling the file into C++ or C#.

15. The system of claim 12, wherein the computer-readable instructions cause the one or more processing devices to:
 receive further user input specifying a third component that is supported by a third API that is different than the first API and the second API to include in the visual design; and
 display the visual design to the user, the displayed visual design including the third component supported by the third API shown with the first component supported by the first API and the second component supported by the second API.

16. The system of claim 15, wherein the first component relies on a first object model, the second component relies on a second object model, and the third component relies on a third object model, the first object model, second object model, and third object model comprising three distinct object models.

17. The system of claim 16, wherein the computer-readable instructions cause the one or more processing devices to provide a unified object model and underlying framework that executes the application by interacting with the first component, the first API, the first object model, the second component, the second API, the second object model, the third component, the third API, and the third object model.

18. The system of claim 16, wherein computer-readable instructions cause the one or more processing devices to build the application without receiving additional user inputs that provide code for calling the first API, the second API, or the third API.

19. The system of claim 18, wherein the first component provides color picking functionality that is supported by the first API.

20. The system of claim 12, wherein the computer-readable instructions cause the one or more processing devices to display the first component supported by the first API and the second component supported by the second API in a user interface view of a development environment.

* * * * *